(12) United States Patent
Chiu et al.

(10) Patent No.: US 7,079,142 B2
(45) Date of Patent: Jul. 18, 2006

(54) SYSTEMS AND METHODS FOR CREATING AND UPDATING AN INTERACTIVE 3D VISUALIZATION OF MEDIA INDICES

(75) Inventors: Patrick Chiu, Menlo Park, CA (US); Tohru Fuse, Fujisawa (JP); Kyuman Song, Cambridge, MA (US); Laurent Denoue, Palo Alto, CA (US); Surapong Lertsithichai, Mountain View, CA (US); Lynn Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 199 days.

(21) Appl. No.: 10/756,397

(22) Filed: Jan. 14, 2004

(65) Prior Publication Data

US 2005/0151737 A1    Jul. 14, 2005

(51) Int. Cl.
*G09G 5/30* (2006.01)
(52) U.S. Cl. ...................................... 345/440
(58) Field of Classification Search ................ 345/440; 715/501.1
See application file for complete search history.

(56) References Cited

U.S. PATENT DOCUMENTS

| | | | |
|---|---|---|---|
| 6,188,403 B1 * | 2/2001 | Sacerdoti et al. | 715/764 |
| 6,535,639 B1 | 3/2003 | Uchihachi et al. | |
| 6,707,454 B1 * | 3/2004 | Barg et al. | 345/440 |
| 2002/0054083 A1 | 5/2002 | Boreczky et al. | |
| 2004/0021685 A1 | 2/2004 | Denoue et al. | |

OTHER PUBLICATIONS

U.S. Appl. No. 10/375,134, filed Feb. 28, 2003, Chiu et al.
Benford, S., Taylor, I., Brailsford, D., Koleva, B., Craven, M., Fraser, M., Reynard G. and Greenhalgh, C. Three Dimensional Visualization of the World Wide Web ACM Computing Surveys 31(4), Dec. 1999.
Benford, S.D., Snowdon, D.N., Greenhalgh, C.M., Ingram, R J., Knox, I. and Brown, C.C., VR-VIBE: A Virtual Environment for Co-operative Information Retrieval, Computer Graphics Forum, 14, (3), pp. 349-360, 1995, NCC Blackwell.
Chiu, P., Boreczky, J., Girgenohn, A., Kimber, D. LiteMinutes: An Internet-based system for multimedia minutes. *Proceedings of Tenth World Wide Web Conference (2001)*, pp. 140-149. See http://www10.org.

(Continued)

*Primary Examiner*—Richard Hjerpe
*Assistant Examiner*—Michelle K. Lay
(74) *Attorney, Agent, or Firm*—Oliff & Berridge, PLC

(57) ABSTRACT

Systems and methods for creating and updating interactive 3D visualizations of media indices wherein separate indices are located above and below a ground plane. The indices are organized in table structure defined by two axes and provide links to the media that is indexed. Various visual characteristics of the indices communicate characteristics of the media that is indexed as well as various user defined or group defined information relating to the indexed media.

41 Claims, 20 Drawing Sheets

OTHER PUBLICATIONS

Chuah, M., Roth, S., Mattis, J., Kolojejchick, J. SDM: Selective dynamic manipulation of visualizations, *Proceedings of the UIST '95*. ACM Press, pp. 61-70.

Denoue, L., Chiu, P., Fuse, T. Shared text input for note taking on handheld devices. *CHI '02 Abstracts*. ACM Press, pp. 794-795.

Frécon, E., Smith, G. WebPath—A three-dimensional Web history, IEEE InfoVis '98, pp. 3-10.

Girgensohn, A., Boreczky, J., Wilcox, L., and Foote, J. Facilitating video access by visualizing automatic analysis. *Proceedings of interact '99*. IOS Press, pp. 205-212.

He, L., Sanocki, E., Gupta, A., Grudin, J. Auto-Summarization of Audio-Video Presentations, *Proceedings of MultiMedia '99*. pp. 489-498.

Learning Landscape, ETH (Federal Institute of Technology Zurich), [http://webarchive.org/web/20011015075552/www.dgj.ch/ethworld/] Nov. 22, 2001.

McKinney, K., Fischer, M., Kunz, J. Visualization of construction planning information. *Proceedings of IUI '98 Conference*. ACM, New York, pp. 135-138.

Mukhopadhyay, S. and Smith, B. Passive capture and structuring of lectures. *Proc. ACM Multimedia '99*. ACM, New York, pp. 477-487.

Rao, R., Card, S. The Table Lens: merging graphical and symbolic representations in an interactive focus + context visualization for tabular information. *Proceedings of CHI '94*. ACM, New York, pp. 318-322, 481-482.

Robertson, G., Card, S., Mackinlay, J. Information visualization using 3D interactive animation. *Communications of the ACM*, 36 (4) (1993), 57-71.

Resnick, P., Neophytos, I., Suchak, M., Bergstrom, P., and Ridel, J. GroupLens: An Open Architecture for Collaborative Filtering of Netnews. *Proceedings of CSCW '94*. ACM, New York, pp. 175-186.

Smoliar, S.W., Zhang, H.J. Content-based video indexing and retrieval. *IEEE MultiMedia*, Summer 1994, pp. 62-72.

Snowdon, D., Benford, S., Greenhalgh, C., Ingram, R., Brown, C., Fahlén, L. and Stenius, M., A 3D Collaborative Virtual Environment for Web Browsing, in *Virtual Reality Universe '97*. Westin Santa Clara Hotel, California, USA, Apr. 1997.

Terveen, L., Hill, W., Amento, B., McDonald, D., and Creter, J. PHOAKS: A System for Sharing Recommendations. *Communications of the ACM*, 40(3), Mar. 1997, pp. 59-62.

Uchihashi, S., Foote, J. Summarizing video using a shot importance measure and a frame-packing algorithm. *Proc. ICASSP '99*, vol. 6, pp. 3041-3044.

Wright, W. Information animation applications in the capital markets. *Proceedings IEEE InfoVis '95*, pp. 19-25, 136-137.

Yeung, M.M., Yeo, B.L. Video visualization for compact presentation and fast browsing of pictorial content. IEEE Transactions on Circuits and Systems for Video Technology, vol. 7, No. 5 (Oct. 97), pp. 771-785.

\* cited by examiner

SYSTEMS AND METHODS FOR CREATING AND UPDATING AN INTERACTIVE 3D VISUALIZATION OF MEDIA INDICES

BACKGROUND OF THE DISCLOSURE

1. Field of Invention

This invention relates to systems and methods for creating and updating interactive 3D visualizations.

2. Description of Related Art

There are a number of conventional methods for indexing media. One popular two-dimensional method arranges hierarchically-organized content on various pages. These conventional methods utilize user interfaces with a number of hyperlinks allowing a user to navigate among the various pages. Many web pages on the Internet are organized in this fashion. FIGS. 1–4 show one example of this type of conventional index, in which training material is organized. FIG. 1 shows the highest-level organization of the media. As shown in FIG. 1, there are 9 modules, each having a hyperlink 101 that allows a user to access the structure of the module. FIG. 2 shows the tree structure 200 within module 3 that depicts the organization of the various media within the module. For instance, FIG. 2 shows leaves 204, branches 203 and root 202. Each leaf 204 of the tree links the user to a media page. Examples of the media pages 300 and 400 are shown in FIGS. 3 and 4.

FIGS. 5 and 6 show another conventional two-dimensional type of media indexing, for indexing meetings. FIG. 5. shows an application 500 that indexes raw data collected during the indexing of recorded meetings, as a table 501 in a web page 502. Each row 503 shows the properties of an index, such as author 504, a time stamp 505, a representative video image 506, a slide image 507, and/or notes 508. Each thumbnail video image 506 accesses and plays the indexed video at the time of the time stamp. Each slide thumbnail 507 accesses a larger view of an indexed slide associated with that time stamp.

FIG. 6 shows the Cscope application 600, which provides a histogram 601 that shows the book marking and note taking activity of users. When a user hovers over a mark 604 on the timeline 602 under the histogram 601, a text note 603 is displayed. Finally, clicking on a mark 604 in the timeline will play the indexed video of the meeting from that point in time.

SUMMARY OF THE INVENTION

There are a number of problems with the type of two-dimensional media index shown in FIGS. 1–4. The complicated hierarchical structure is time-consuming to navigate. Furthermore, only a limited amount of information is displayed to the user at any one time. Therefore, it becomes very easy to lose sight of the overall organization of the indexed media, necessary for a complete understanding of the indexed media. For instance, the tree page 200, shown in FIG. 2, cannot show all of the leaf media, while the module page 100, shown in FIG. 1, cannot show all of the tree structure. Because the interaction for such a conventional indexing system is limited to invoking the hyperlinks 101 and 204 and to page turning, using buttons 301, 302, 401 and/or 402, easily moving from one media page in one module to another media page in another module requires that the user navigate a number of hyperlinks 101 and/or 204 and/or buttons 301, 302, 401 and/or 402.

Furthermore, learning paths based on the above-described conventional indices are inflexible, because they are dependent upon the pre-defined tree structure. As such, instructors or users cannot create a customized path or syllabus. Finally, note taking, content rating, and knowledge sharing are not supported.

The types of meeting media indices shown in FIGS. 5 and 6 share similar problems. The indices are limited to one meeting per page. As such, a user is unable to effectively cross-reference between related meetings. Furthermore, there is no distinction between one users' personal notes and bookmarks, and other users' notes and bookmarks.

There are a number of conventional 3D interactive landscapes for information visualization such as SDM, WWW3D, WebPath, VR-VIBE or Information Animation. These 3D landscapes use a single, above the ground landscape. Therefore, they are not able to effectively provide the user with separate indices in the same 3D visualization. In some of the conventional 3D systems, negative values for an index are displayed below the ground plane. However, these negative values come from the same function that calculated the above ground values and do not provide a separate type of indices for visualizing a different set of properties.

This invention provides a double-sided 3D interactive visualization of two separate types of indexes.

This invention separately provides for the indexes to be organized in a table structure defined by two axes.

This invention separately provides for the visualization of one index to be located above the ground plane, and the other index to be located below the ground plane.

This invention separately provides for each index to include various links that link to the various media of each index.

This invention separately provides for the various links to visually describe various characteristics of the media to which they link.

This invention separately provides for the various links to visually describe various personal or group ratings of the media.

This invention separately provides for the point of view of the visualization to be inclined at any angle and positionally adjusted in three dimensions.

This invention separately provides for a user to define a path throughout the various links that make up each index.

This invention separately provides for a user to transpose the indices such that the index that was previously below the ground plane is above the ground plane and the index that was previously above the ground plane is below the ground plane.

This invention separately provides for a user to superimpose the indices such that both indices are above the ground plane.

These and other features and advantages of various exemplary embodiments of systems and methods according to this invention are described in, or are apparent form, the following detailed description of various exemplary embodiments of the systems and methods according to this invention.

BRIEF DESCRIPTION OF THE DRAWINGS

Various exemplary embodiments of systems and methods according to this invention will be described in detail, with reference to the following figures, wherein.

DETAILED DESCRIPTION OF EXEMPLARY EMBODIMENTS

Figure 9:
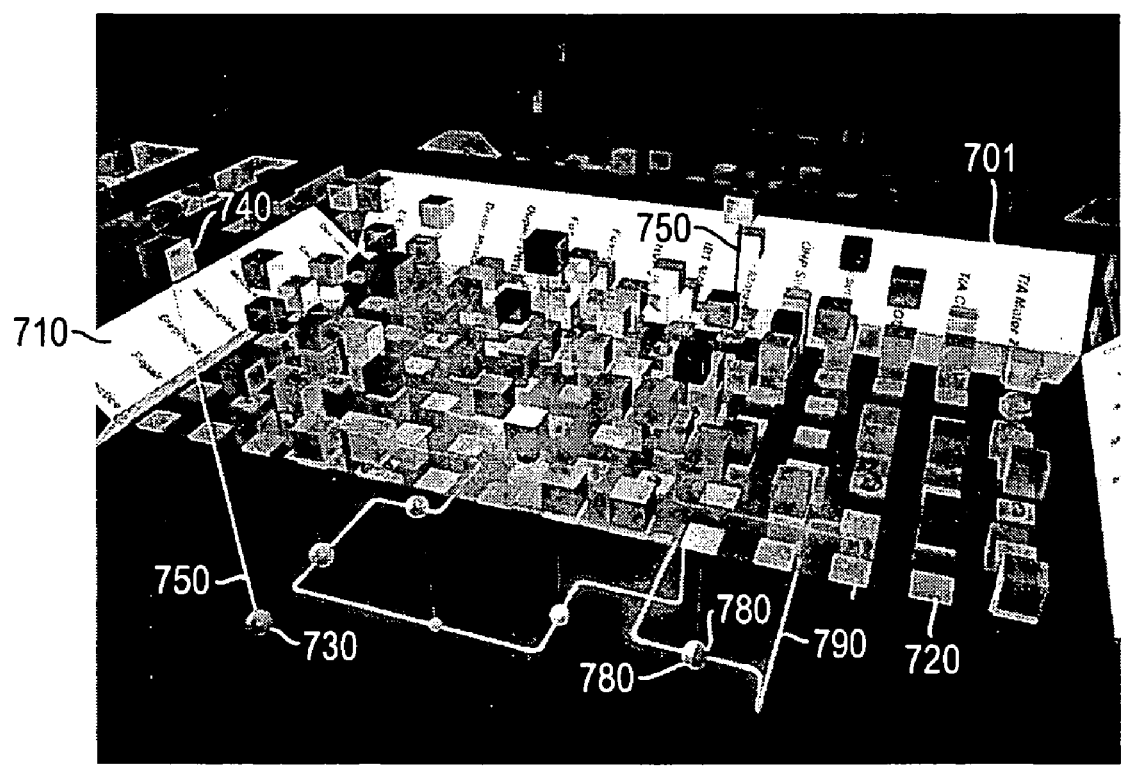
Figure 10:
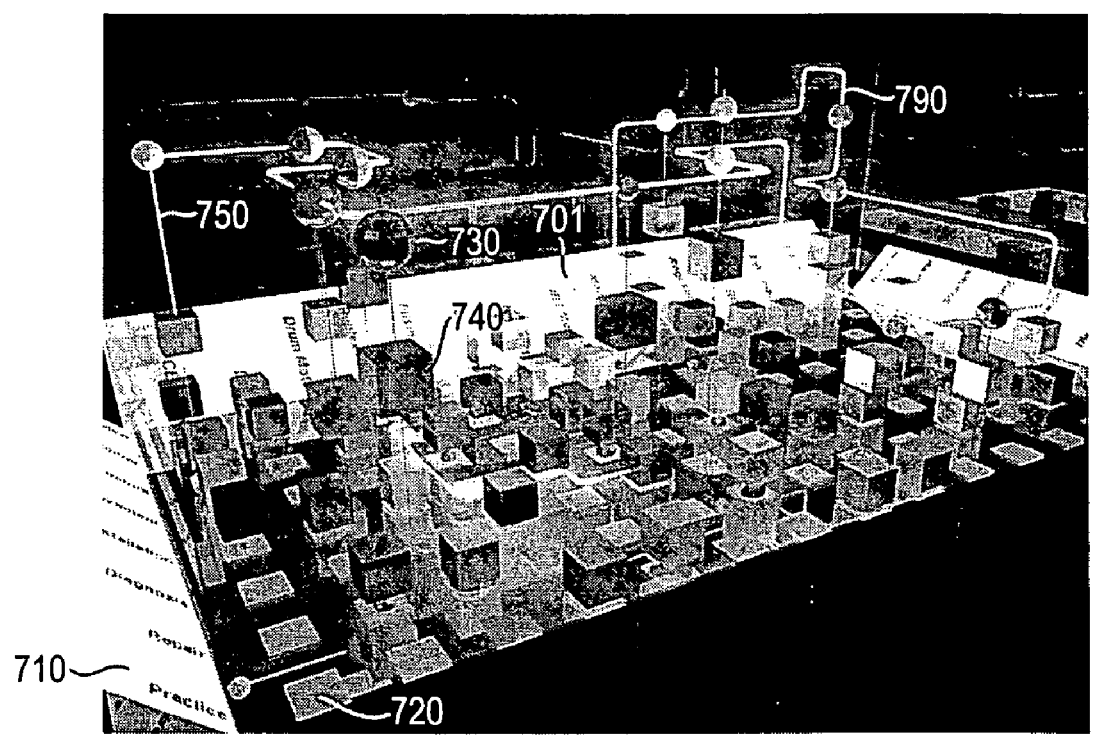
Figure 11:
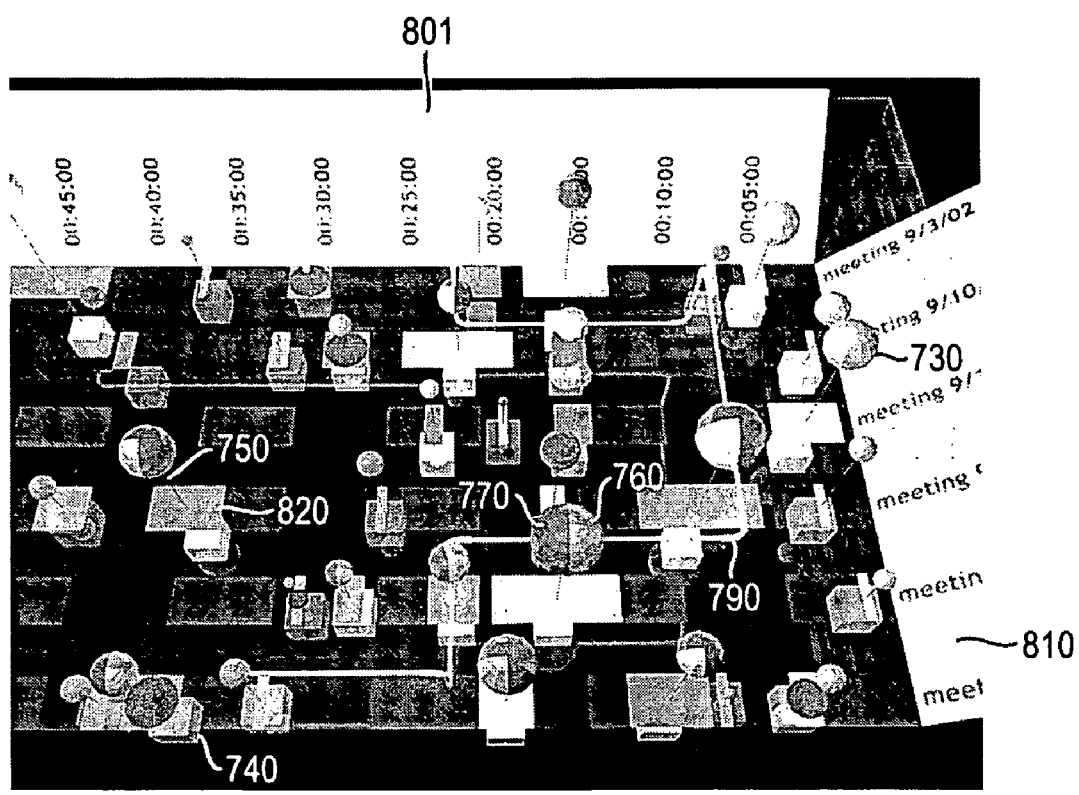
FIGS. 11 and 12 show a specific example of a 3D visualization in which the indexed data is a group of recorded meetings.
Figure 12:
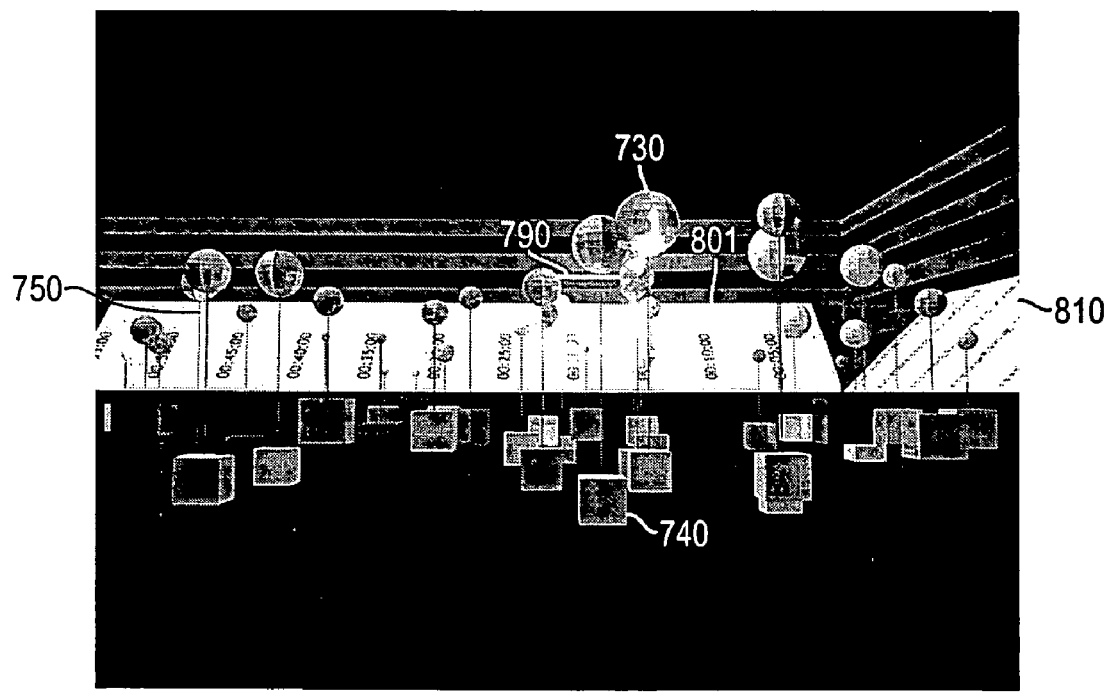

For ease of explanation various exemplary embodiments of this invention will be described with reference to three specific examples: a first example, which is based on a table data model that is shown in FIGS. 7–10; a second example, which is based on a timeline data model, that is shown in FIGS. 11 and 12; and a third example, which is based on a search results data model. Each specific example is intended to provide a frame of reference in which the more general exemplary embodiments will be described. However, these specific examples are not intended to limit the exemplary embodiments or disclosed invention.

Figure 1:
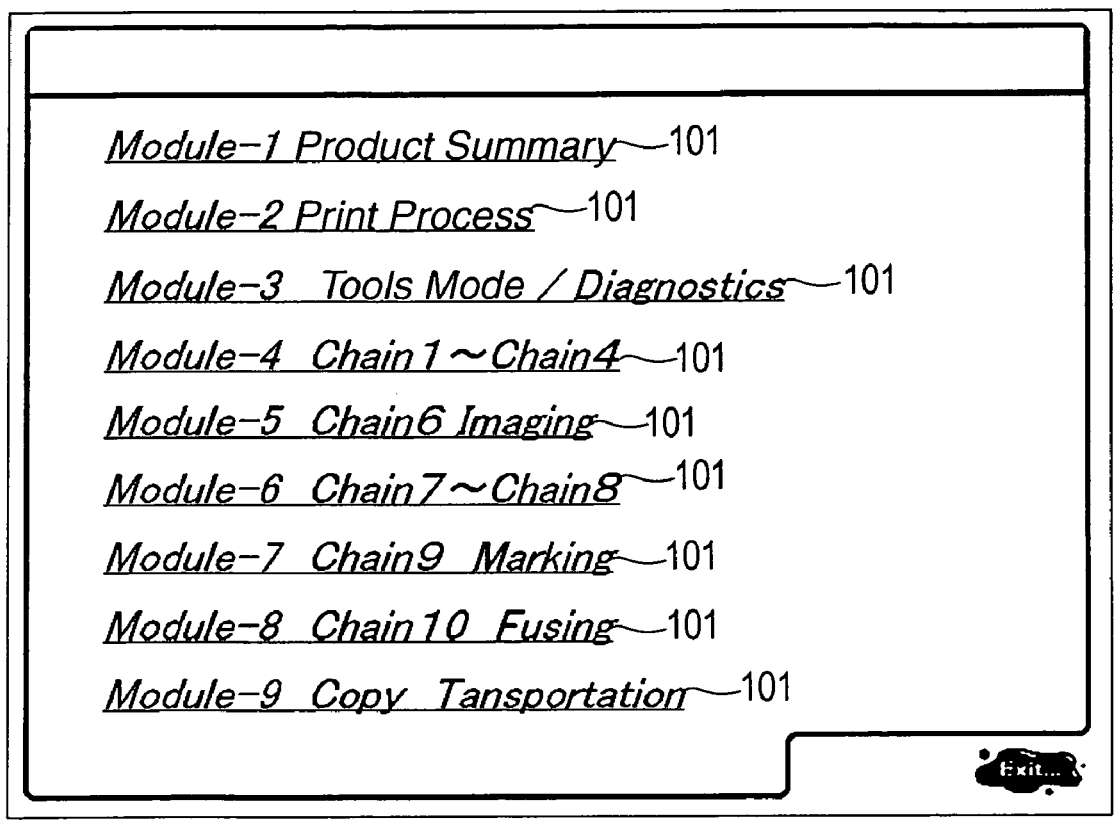
FIG. 1 shows a module page of a conventional two-dimensional media index.
Figure 2:
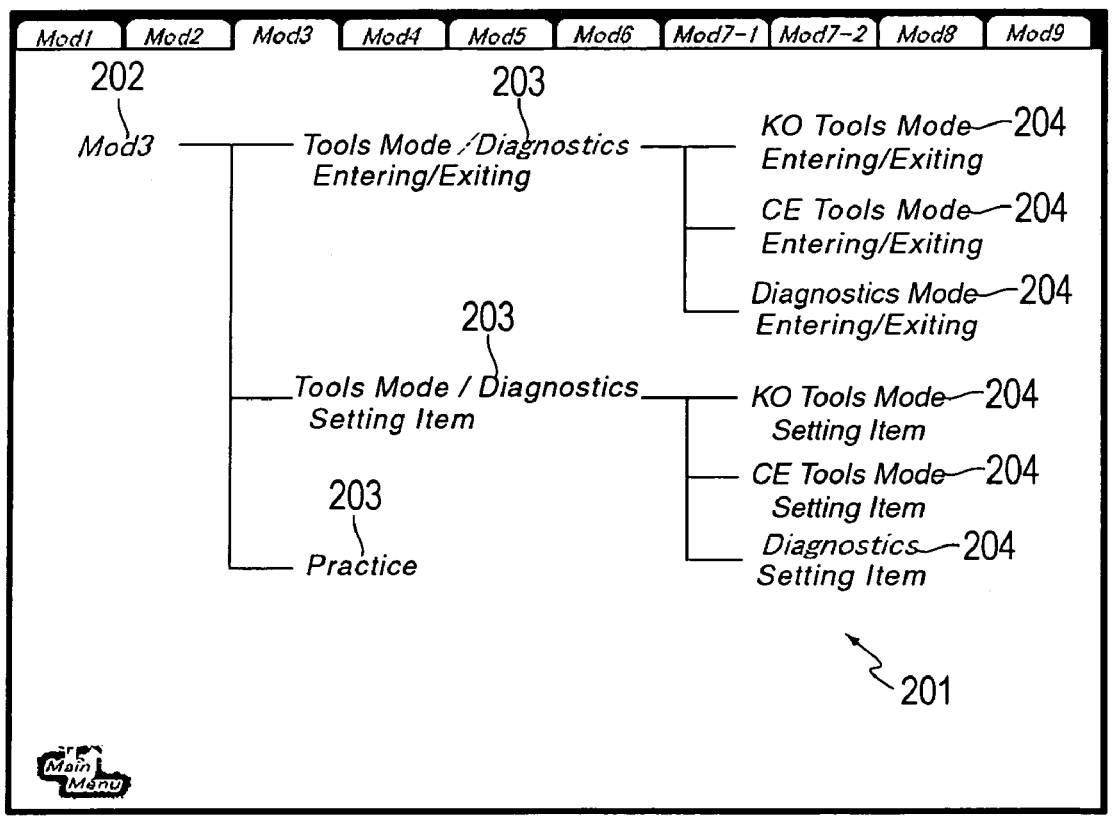
FIG. 2 shows a tree page of a conventional two-dimensional media index.
Figure 3:
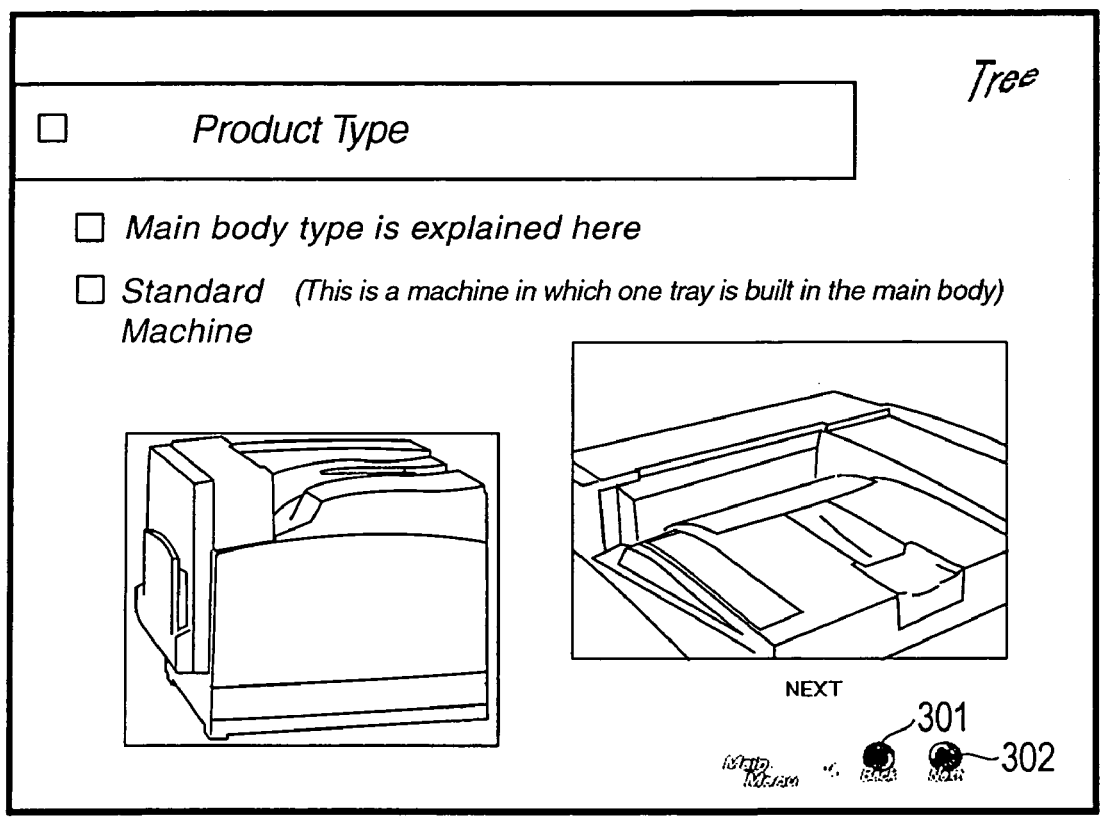
FIGS. 3 and 4 show media pages of conventional two-dimensional media indices.
Figure 4:
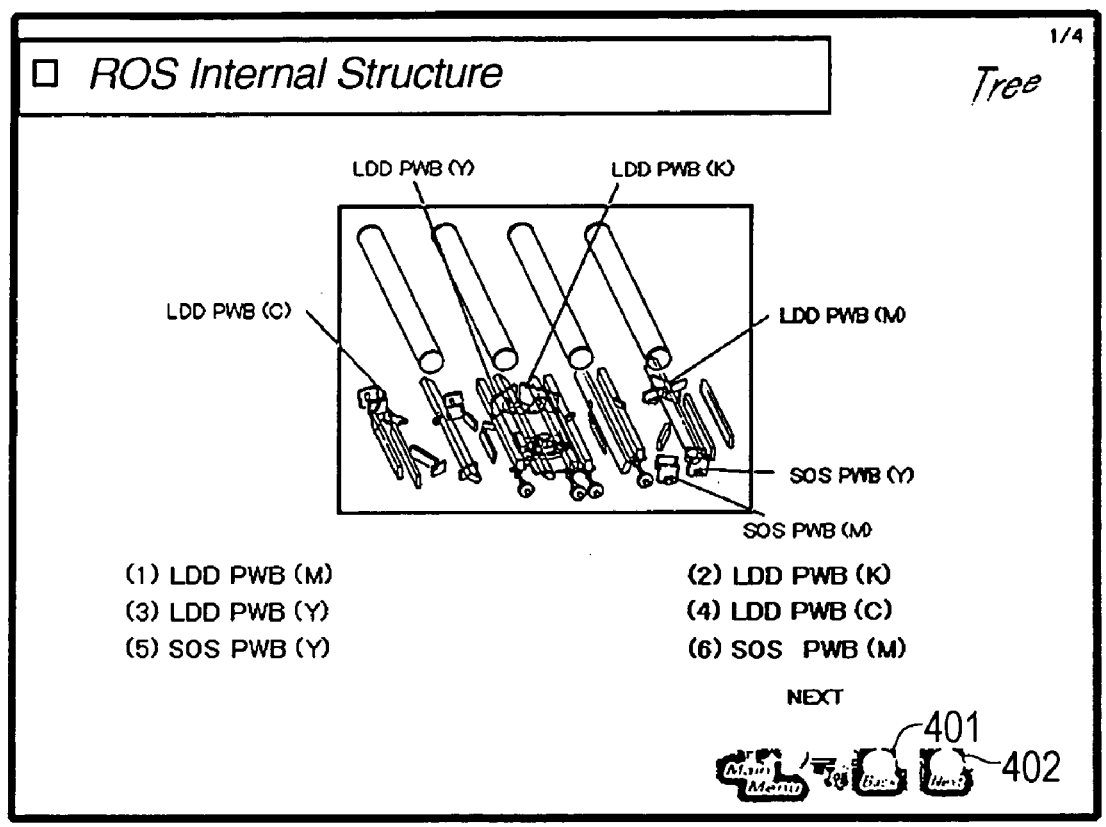

The first specific example, shown in FIGS. 7–10, shows a 3D visualization of a training syllabus. In the first example, the indexed media is similar to the leaves 300 and 400 shown in FIGS. 3 and 4 and may contain text, graphics, video, etc. The ground plane is defined by a number of tiles 720, each tile defined by its position according to two axes 701 and 710. The first axis 701 represents part names, while the second axis 710 represents task types. Each tile 720 has a first link 730 above the ground plane that provides a link to the multimedia content indexed by the tile 720 and a second link 740 that provides a separate link to group content related to the corresponding first link 730 for the same tile. Spaces between the tiles 720 allow the user to see the links 730 and 740 both above and below the ground plane. Both the first links 730 and the second links 740 are tethered to the tiles 720 by strings 750, which help a user determine which ones of the links 730 and 740 are associated with each tile 720.

Figure 7:
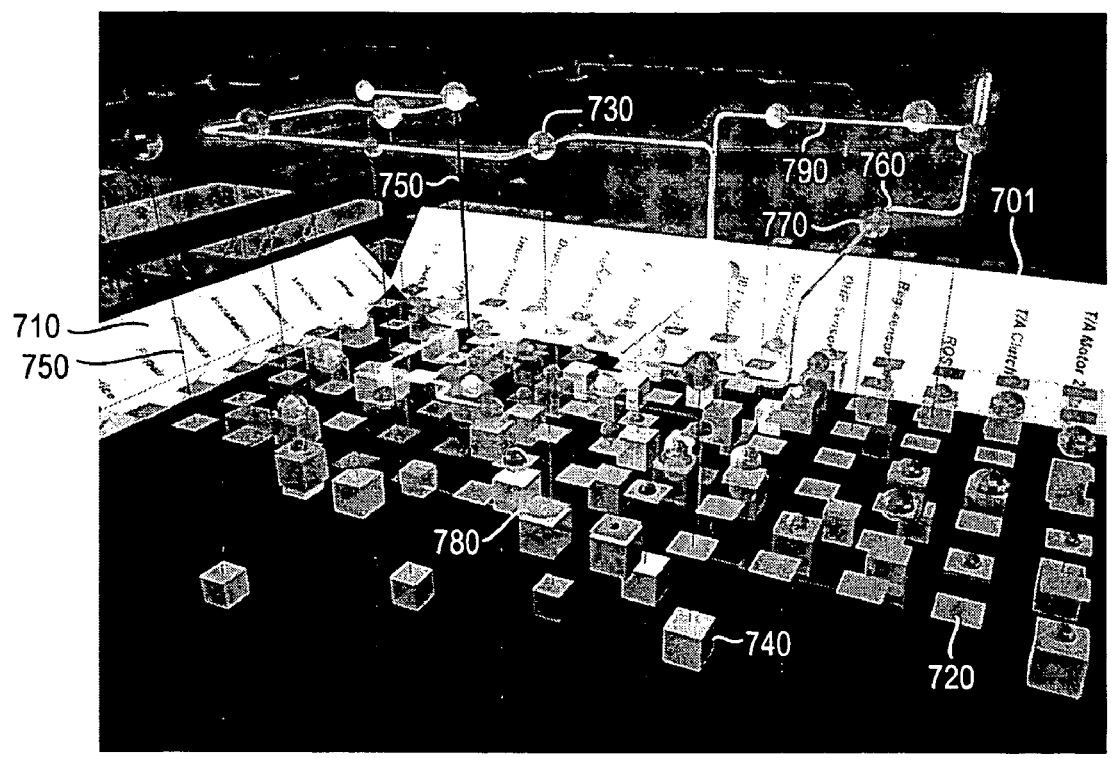
FIGS. 7–10 show a specific example of a 3D visualization of a training syllabus.
Figure 8:
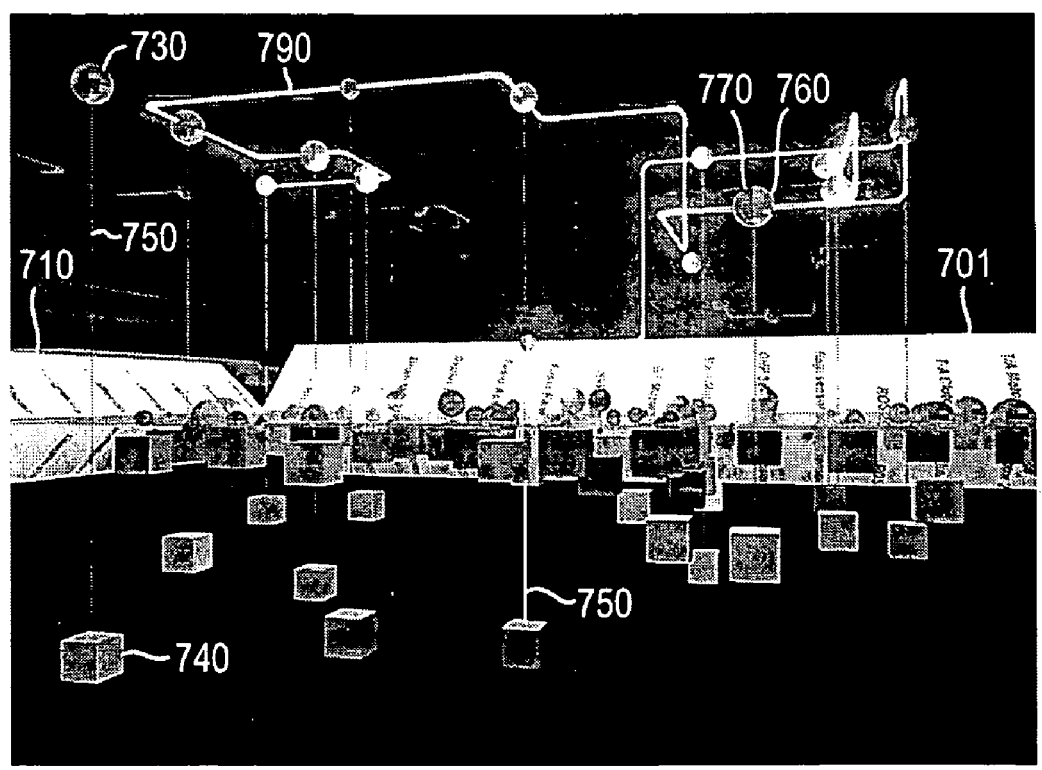

In the first specific example, the sizes of the first links 730 and the second links 740 reflect the amount of multimedia data represented by the tile 720, and the amount of group content related to the tile 720, respectively. In this first specific example, a height of the first link 730 is determined by a user's rating of the importance of the multimedia content indexed by the associated tile 720. The height of a second link 740, which, in the embodiment shown in FIGS. 7 and 8 is the distance below the plane of the tiles 720, is determined by a defined group of users' combined rating of the multimedia content indexed by the tile 720 corresponding to that second link 740. In various exemplary embodiments, the users' combined rating of the multimedia content is determined by averaging the personal ratings of the multimedia content of the various users within the defined group. The color or colors of the fist links 730 represent the type of multimedia data indexed by the tile 720. For instance, one color may represent text data, while another color represents graphic data, and a third color represents video data. When more than one type of multimedia data is represented by a tile 720, the first link will be more than one color, such as, for example, the colored areas 760 and 770 of the first link 730 shown in FIG. 7.

In various exemplary embodiments of methods for creating an interactive 3D visualization according to this invention, it is useful for a viewer to know whether a link has been visited and that its content viewed. Therefore, in the first specific example shown in FIGS. 7–10, a link that has been visited has a red circle 780 superimposed on the corresponding tile 720. Additionally, the first specific example shows a pipe 790 that connects various first links 720 in a predetermined order. For instance, a course instructor may have defined a path, represented by the pipe 790, through the indexed media that the instructor would like a defined group such as, for example, a class being taught, to follow. Alternatively, a user may have defined a path through the indexed media, again represented by the pipe 790, that the user has determined to be beneficial.

Figure 5:
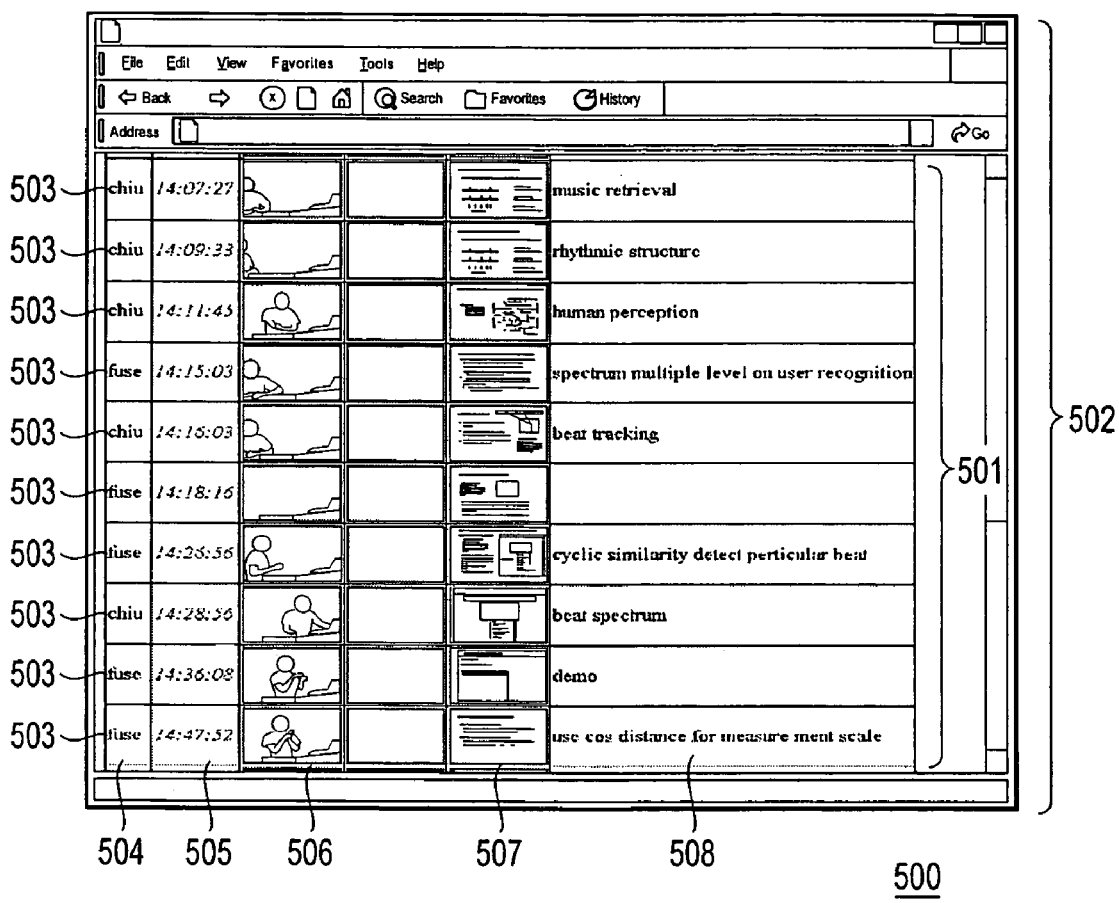
FIG. 5 shows a conventional two-dimensional media index for recorded meetings.
Figure 6:
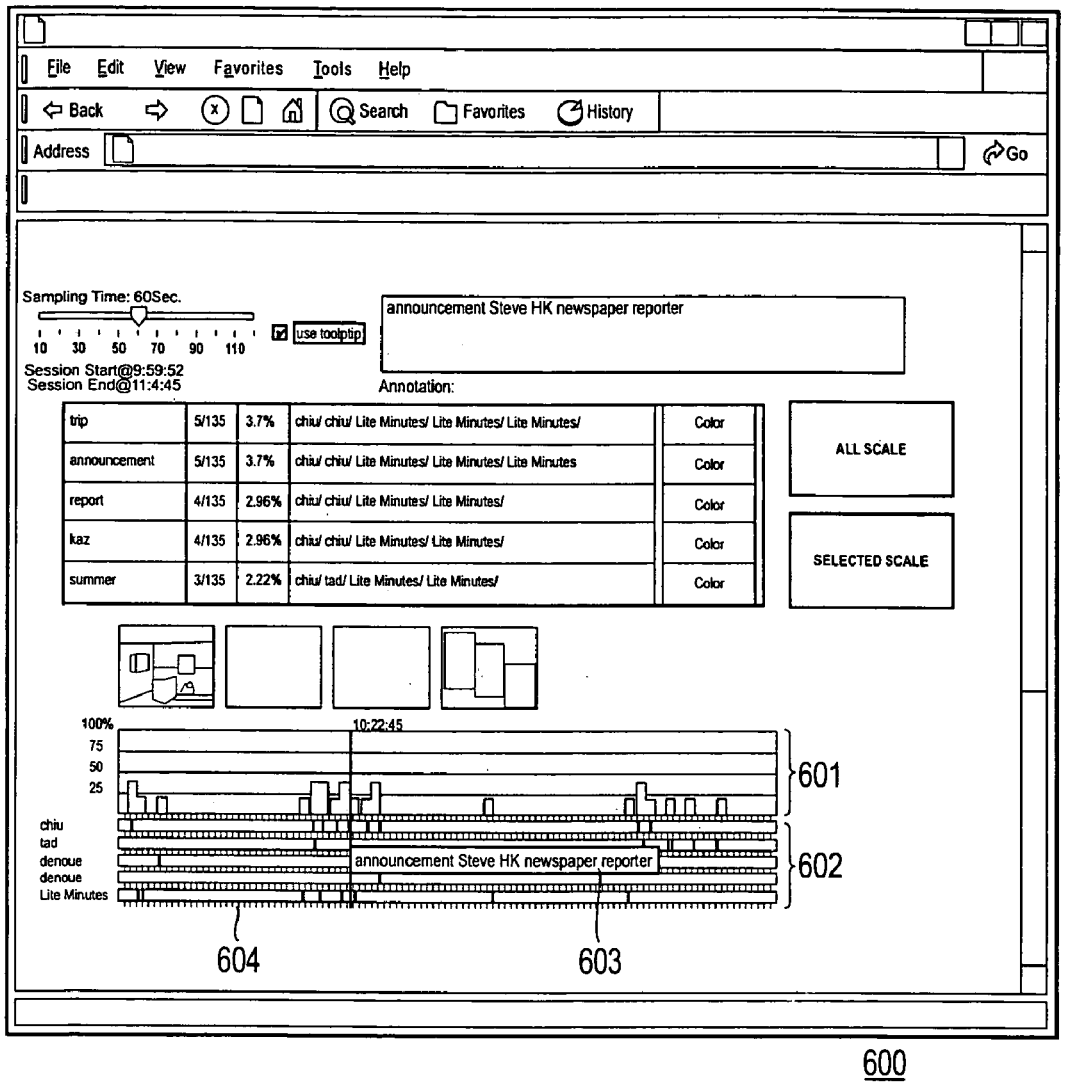
FIG. 6 shows another conventional two-dimensional media index for recorded meetings.

FIGS. 11 and 12 show a second specific example in which the data being visualized is a group of recorded meetings. In the second example the indexed media is similar to that indexed by the conventional methods shown in FIGS. 5 and 6 and may include text, graphics, video, etc. As shown in FIGS. 11 and 12, meeting dates are listed along one axis 810 and time marks, representing the time from the start of the meeting, are listed along the other axis 801. A strip of tiles 820 represents each meeting. Many of the elements of the second example are the same or similar as the elements of the first example and will not be described herein. The main difference between this specific example and the first specific example is that, in this second example 800, in contrast to the first example 700, shown in FIGS. 7–10, the tiles 820 are not square. The tiles 820 represent events of different durations, where the durations are mapped to the lengths of the tiles according to the scale of the duration axis 801. Similar to the first specific example, the sizes of each first link 730 represent the amount of information associated with a tile 820. Also, the color patches (e.g., 760 and 770) correspond to different types of media. Again, the height of the first link 730 corresponds to an importance of the event represented by the tile 820. Finally, the pipe 790 represents a defined path through the various event related media indexed by the tiles 820. For instance, the pipe 790 may link together all media related to the summaries of every meeting, or all media related to the portions of each meeting in which the participants discussed a specific subject.

Figure 13:
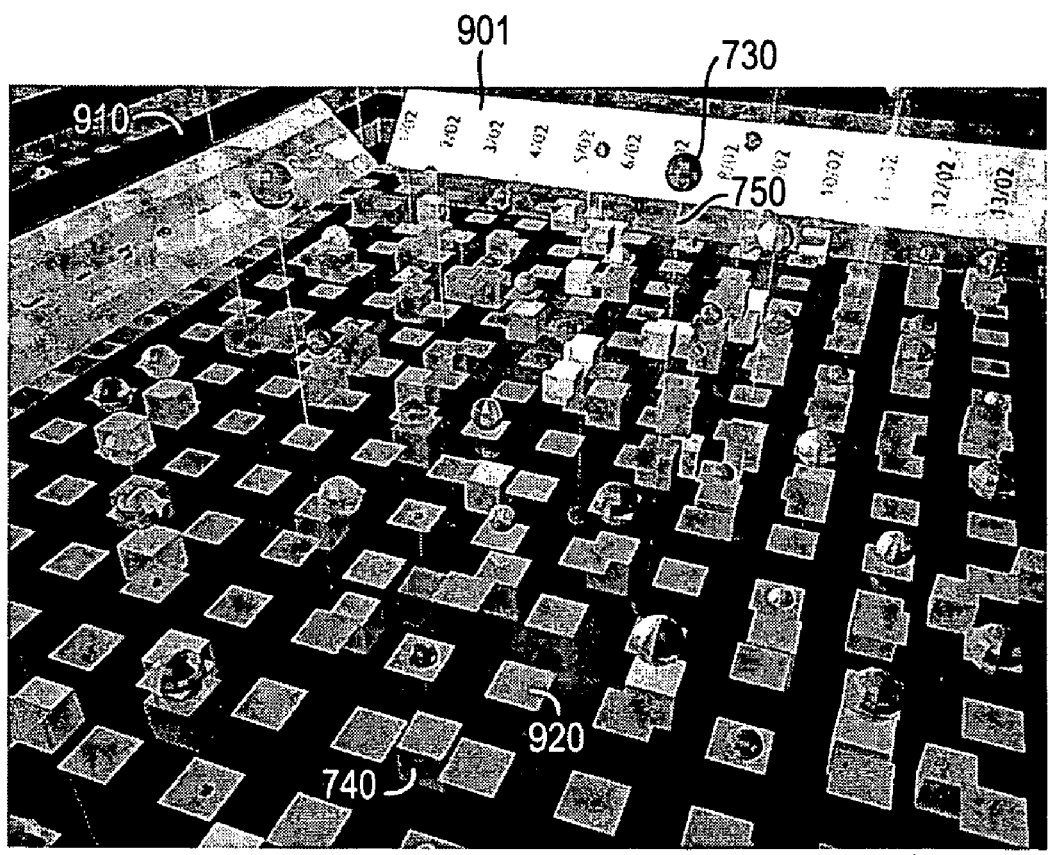
FIG. 13 shows a specific example of a 3D visualization, in which the indexed data is search results provided by a search engine.

FIG. 13 shows the third specific example, in which the data being visualized is search results provided by a search engine. The first axis 901 represents months, while the second axis 910 is labeled alphabetically. In this manner, each tile 920 represents a bundle of documents returned by a search and organized by date, such as, for example, the month that the content was created or last altered and alphabetically by title. It should be appreciated that search results may be organized in any number of ways, and the axes 901, 910 may be defined accordingly. In the third specific example, the heights of the first links 730 are not manually set by user rating, as in the first and second specific examples, but rather are set automatically according to the relevance scores returned by a search engine. The second link 740 represents a defined group's recommendations for the same query, where the group is, for example, defined by all or part of the search engine users who performed the same or a similar search.

As indicated above, the three specific examples are described to provide a reference within which the more generalized exemplary embodiments may be described. Again, the specific embodiments are only provided for reference and are not intended to limit the scope of the invention in any manner.

Figure 14:
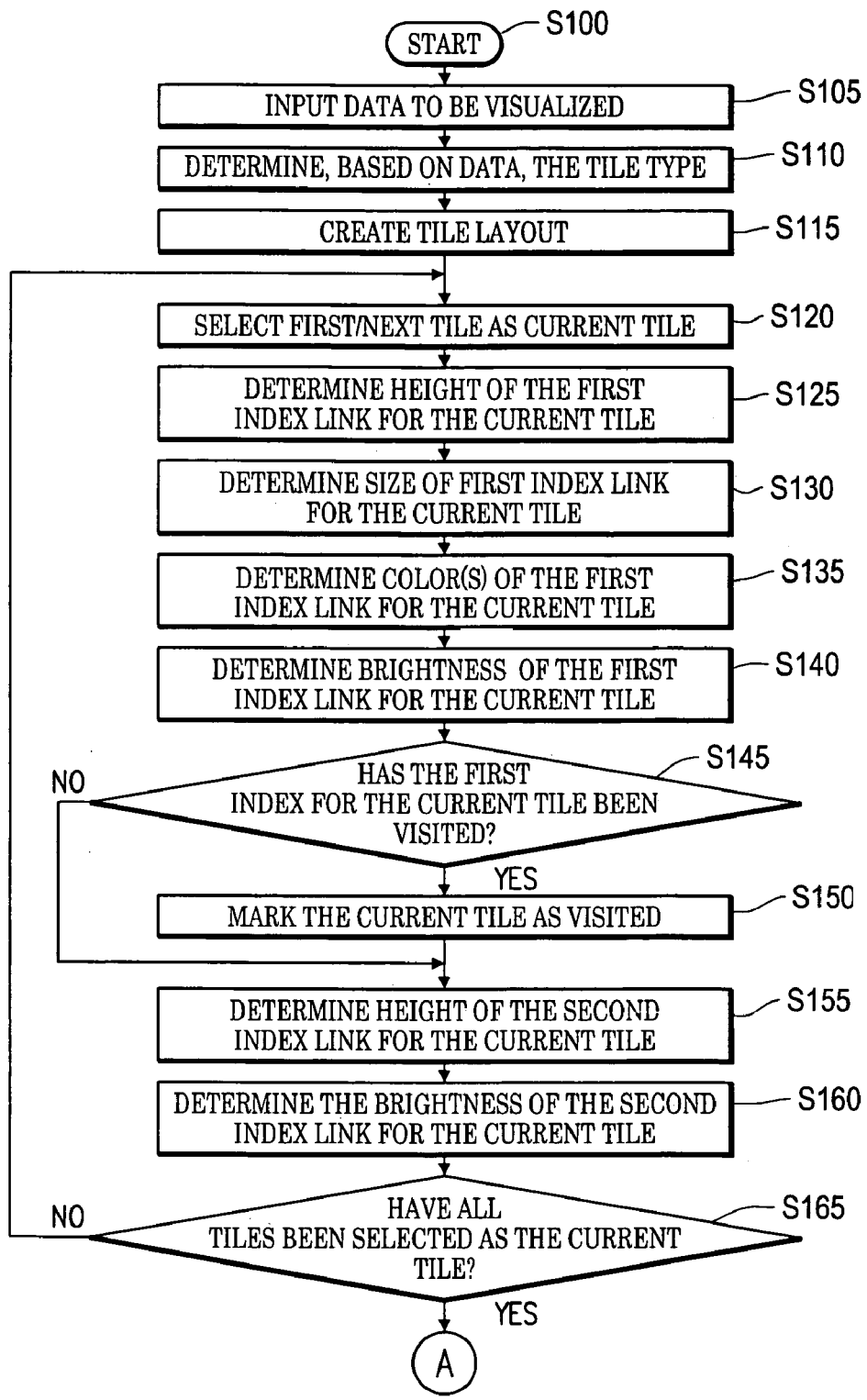
FIGS. 14 and 15 show a flowchart outlining one exemplary embodiment of a method for creating an interactive 3D visualization according to this invention.
Figure 15:
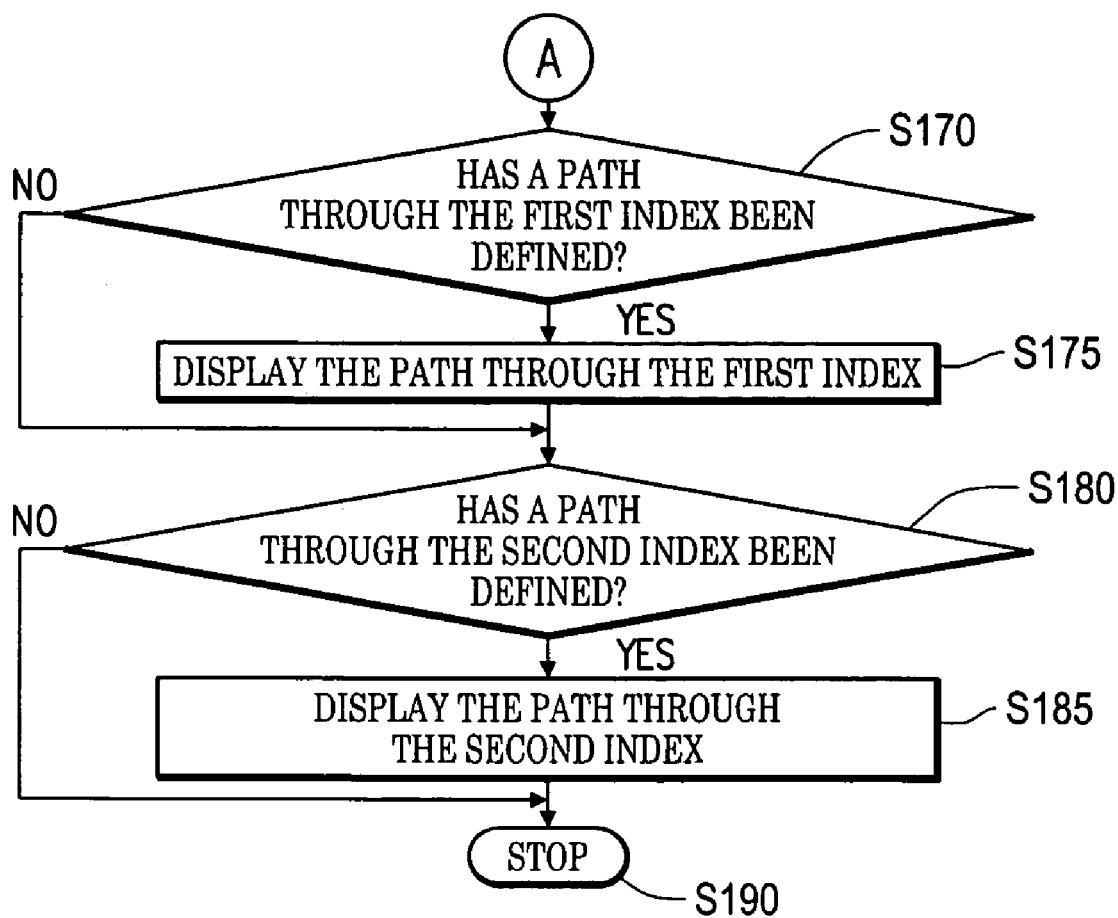
Figure 16:
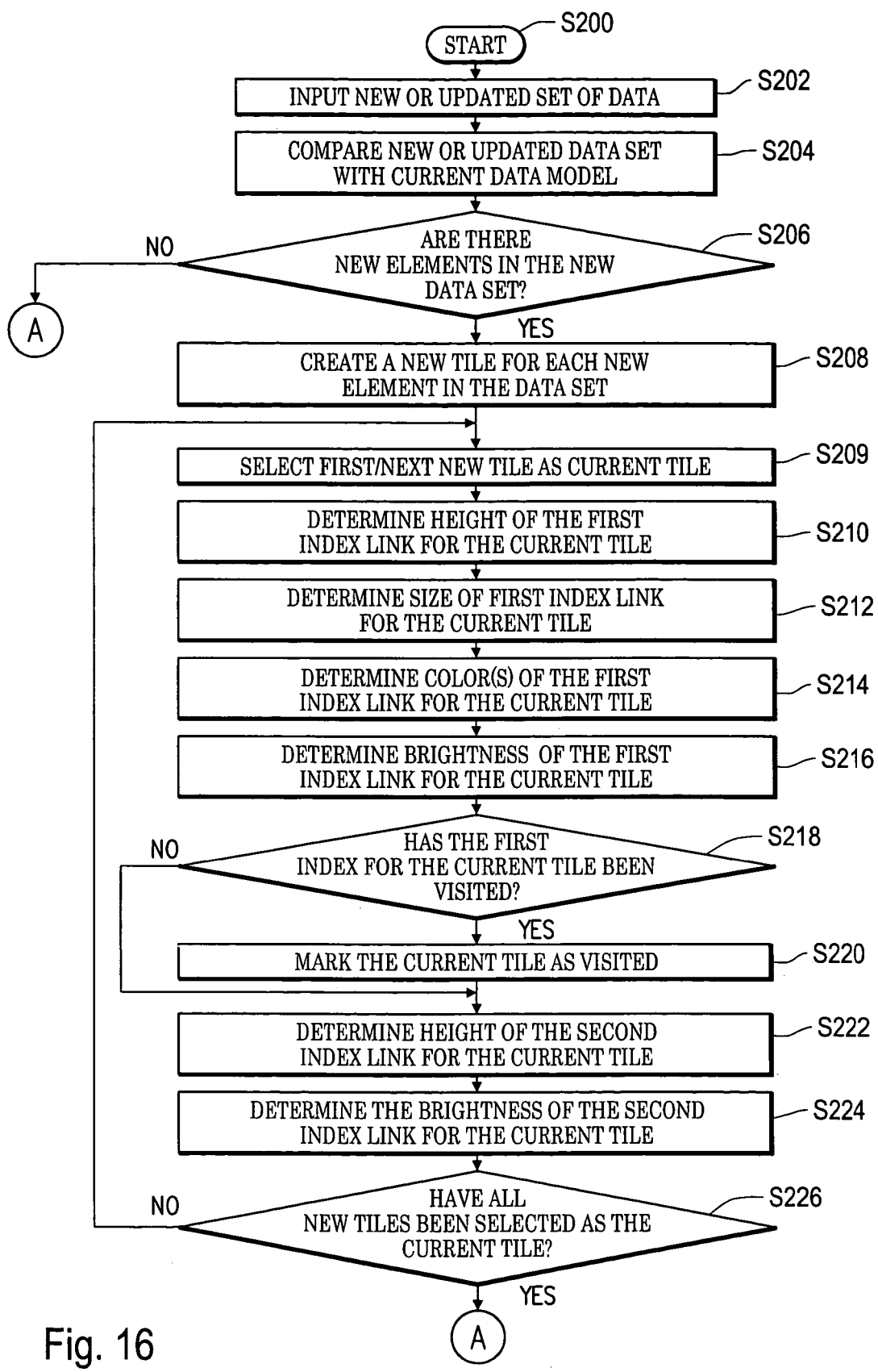
FIGS. 16 and 19 show a flowchart outlining one exemplary embodiment of a method for updating a 3D visualization according to this invention.
Figure 17:
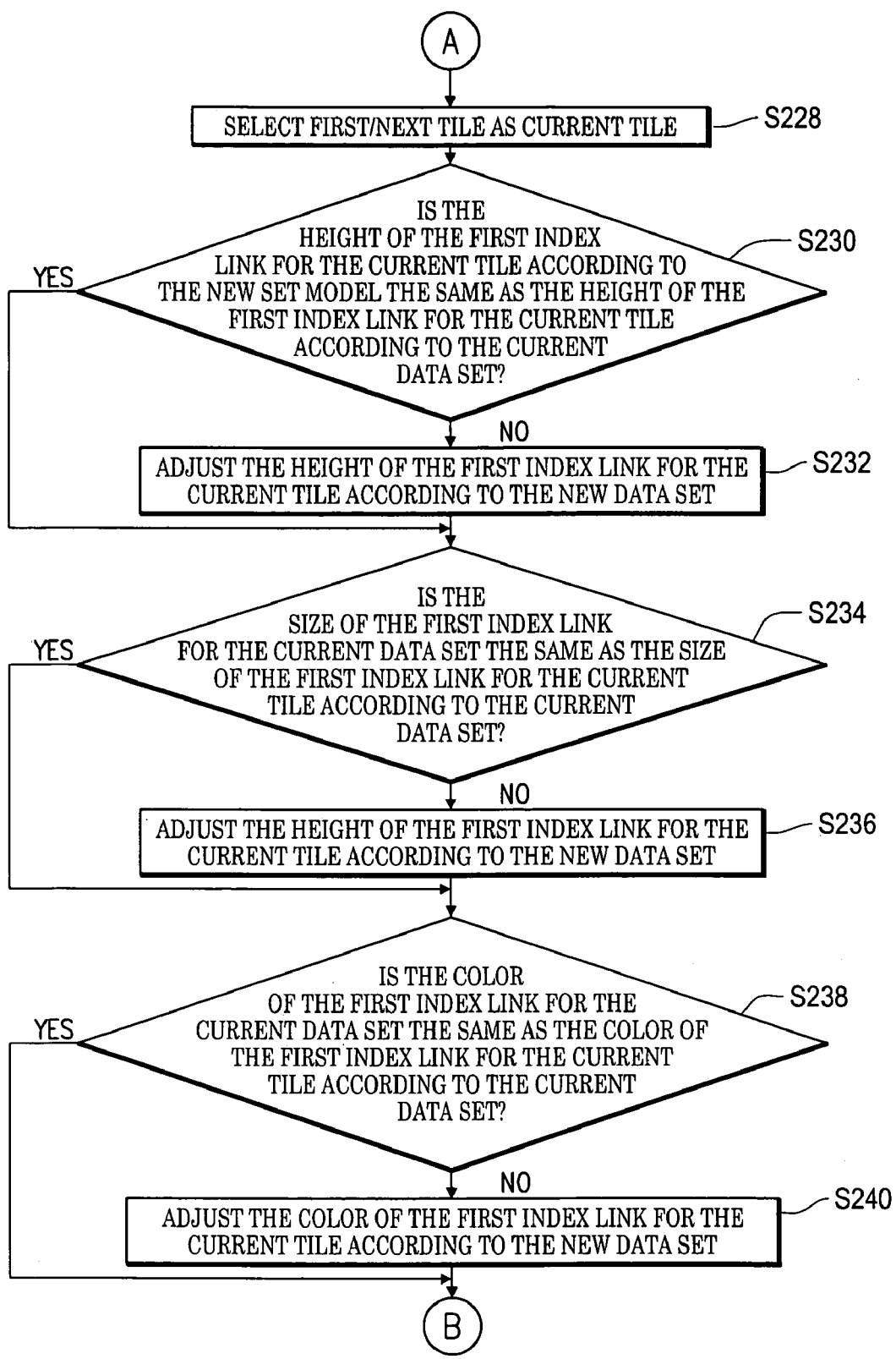
Figure 18:
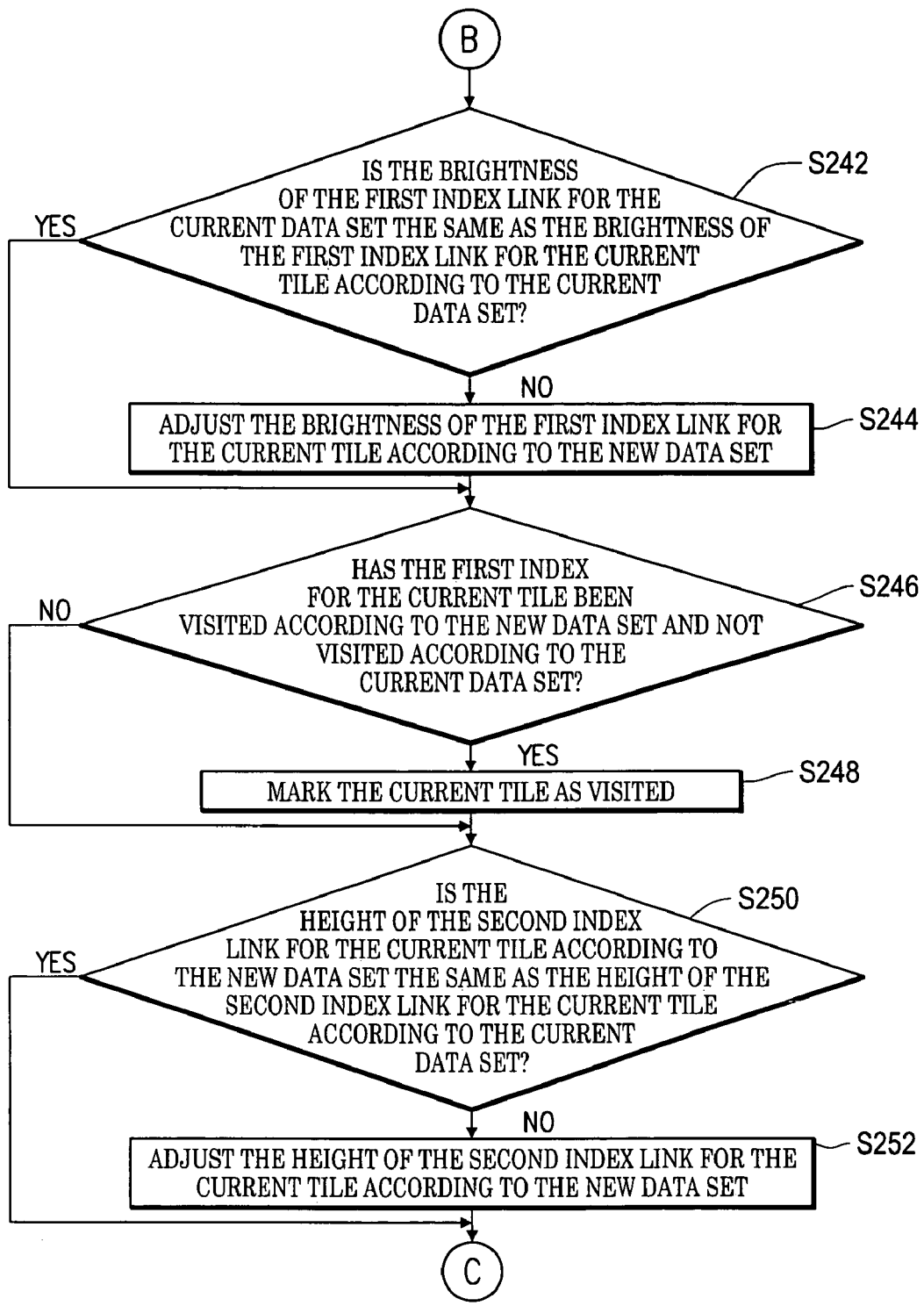
Figure 19:
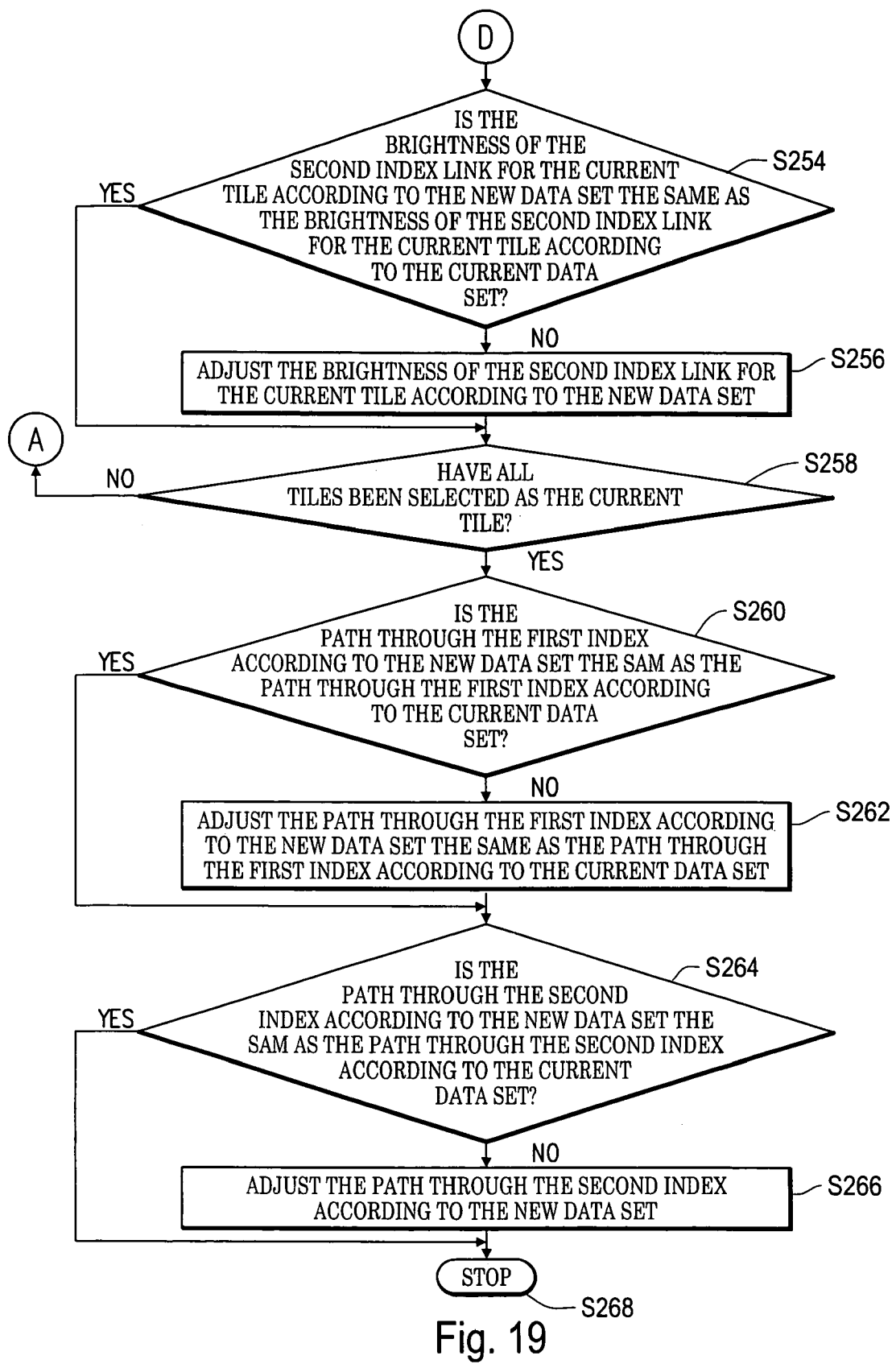

FIGS. 14 and 15 show a flowchart outlining a more generalized exemplary embodiment for creating a 3D visualization according to the invention. It should be appreciated that this more generalized exemplary embodiment may be used to index any media that is capable of being defined by two axes. Furthermore, any characteristic of the indexed media may be reflected by the characteristics of the first and/or second indices.

As shown in FIGS. 14 and 15, operation of the flowchart begins in step S100 and continues to step S105, where the data to be visualized is input. According to various exemplary embodiments of the method for creating an interactive 3D visualization according to this invention, any set of data in which the data may be divided into portions and those portions represented by tiles with at least two values assigned to each tile, may be visualized using systems and methods according to this invention. Then, in step S110, the tile type is determined based on the input data. For instance, in FIGS. 7–10, the tiles 720 are square tiles defined by the values along each axis 701 and 710. In FIGS. 11 and 12, the tiles 820 are rectangular tiles defined by a value along the axis 810 and a length, in this case time, along the axis 801. Finally, in FIG. 11, the tiles 920 represent search results defined by the values along each axis, in this case, first letter and creation month. It should be appreciated that each tile 720, 820, and 920 is capable of being defined along two axes.

Next, in step S115, a tile layout is created based on the data to be visualized and the determined tile type. When the values on the axes can be defined in equal increments, the tiles are typically square, as in FIGS. 7–10 and 13. Alternatively, at least one of the axes may define a value in which the size of the tile along that axis represents a quality of the data, as in FIGS. 11 and 12, where one axis 801 is defined by time and the size of the tile along that axis 801 represents a duration of time for the data represented by that tile 820. Operation continues to step S120.

In step S120, a first or next tile is selected as the current tile. Then, in step S125, the height of a first index link is determined for the current tile. Various exemplary embodiments of methods for creating an interactive 3D visualization according to this invention are capable of showing two values, or index links, for each tile, one above a ground plane defined by the tiles, and one below the ground plane. In various exemplary embodiments of methods for creating an interactive 3D visualization according to this invention, the height of the first index value represents the importance of that link. However, the height may represent some other quality of the data represented by the tile. Next, in step S130, a size of the first index link for the current tile is determined. Operation then continues to step S135.

In step S135, one or more colors for the first index link for the current tile are determined. In various exemplary embodiments of methods for creating an interactive 3D visualization according to this invention, each of the one or more colors for the first index link represent a quality of the data, such as, for instance, the type of data, where different colors are used for graphic data, text data, video data, etc. However, the color or colors of the first index link may represent any other salient characteristic of the data being visualized. Next, in step S140, the brightness of the first index link for the current tile is determined. In various exemplary embodiments of methods for creating an interactive 3D visualization according to this invention, the brightness of the first index link may represent any quantifiable characteristic of the data being visualized, represented by the current tile, that may be compared to the same characteristic of other tiles. In various exemplary embodiments, the greater the brightness assigned to a given first link, the larger quantum of that characteristic the corresponding tile has. Operation then continues to step S145.

In step S145, a determination is made whether, the user has visited the portion of the data represented by the current tile. It should be appreciated that, in various exemplary embodiments, the first index provides a link to the data represented by the current tile. Therefore, if data represented by the current tile has been visited by the user, operation continues to step S150. If the first index has not been visited by the user, operation directly jumps to step S155. In step S150, the current tile is marked as visited. For example, in the first specific example, a tile 720 is marked with a red circle 780 to indicate that it has been visited. However, various other methods of marking the current tile may be used. Furthermore, in various other exemplary embodiments of methods for creating an interactive 3D visualization according to this invention, a tile representing data that has not been visited may be marked instead of a tile representing data that has been visited. Operation then continues to step S155.

In step S155, a height of a second index link for the current tile is determined. In various exemplary embodiments of methods for creating an interactive 3D visualization according to this invention, the height or more generally, the distance from the ground plane, of the second index value represents an average of the importance of the data represented by the current tile as determined by other group members. However, the height may represent any other quantifiable quality of the data represented by the current tile. Next, in step S160, the brightness of the second index link for the current tile is determined. In various exemplary embodiments of methods for creating an interactive 3D visualization according to this invention, the brightness of the second index link represents any quantifiable characteristic of the data being visualized. In various exemplary embodiments, the brighter tile has the larger quantum of that characteristic. For example, in the first and second specific examples, the brightness of the second link indicates the number of people in a defined group that have rated the media represented by the current tile. Operation then continues to step S165.

In step S165, a determination is made whether all of the tiles have been selected as the current tile. If all of the tiles have not been selected as the current tile, operation returns to step S120, where the next tile is selected as the current tile. However, if all of the tiles have been selected as the current tile, operation continues to step S170. Where a determination is made whether a path through the first indices has been defined. If a path has not been defined, operation jumps directly to step S180. If a path has been defined through the first indices, operation continues to step S175, where the path through the first indices is displayed. Next, in step S180, a determination is made whether a path through the second indices has been defined. If a path has not been defined, operation jumps directly to step S190. If a path has been defined through the second indices, operation continues to step S185, where the path through the second indices is displayed. Then, in step S190, operation of the flowchart terminates.

It should be appreciated that, in various other exemplary embodiments of methods for creating an interactive 3D visualization according to this invention, many other qualities of the first index links may defined as well, such as pattern, texture, or any other visually discernable characteristic. Similarly, it should be appreciate that, in various other exemplary embodiments of methods for creating an interactive 3D visualization according to this invention, other qualities of the second index links may defined, such as size, color, pattern, texture, or any other visually discernable characteristic. Furthermore, in various other exemplary embodiments of methods for creating an interactive 3D visualization according to this invention, the value defining the characteristic for one or more second index links may be determined as an average of the values of the corresponding characteristic of the corresponding first link over a defined group of users.

In various exemplary embodiments of methods for creating an interactive 3D visualization according to this invention, the 3D visualization is implemented using a graphical user interface with which a user may align the data. Therefore, the data to be visualized and the 3D visualization periodically communicate with one another. Any changes made to the data to be visualized are reflected in the 3D visualization. The data to be visualized may be changed in a number of ways. For instance, the user may interact with the visualization and any changes to the visualization, such as for instance, a user visiting a previously un-visited tile or a path being defined through the fist links, are reflected in the data to be visualized. Alternatively, the data to be visualized itself may be changed. For example, another user may interact with a separate visualization and that other user's interaction can affect the group data represented by the second indices, for instance, the other user may rate the media represented by a tile. As a result, the rating will now become part of the groups average rating for that tile. Every set of data to be visualized within the group will be altered to reflect the updated average rating.

When implementing various exemplary embodiments of the above-described 3D visualization according to this invention using a graphical user interface, various exemplary embodiments provide a number of functions that facilitate the effective viewing and interaction with the various portions of the 3D visualization. Various exemplary embodiments enable a user of the 3D visualization to change the viewing angle. For example, FIG. 8 shows the visualization of the first specific example, in which the view has been aligned with the ground plane to facilitate viewing both the first links 730 and the second links 740. A user may change the viewing angle by, for example grabbing the visualization and rotating it with a pointing device, a touch screen, or using virtual reality interaction devices such a glove, using keyboard commands, or using any other known or later-developed input device.

Various exemplary embodiments of the 3D visualization, when implemented using a graphical user interface, include a transpose indices feature. The transpose indices feature is shown in FIG. 9 with respect to the first specific example. The transpose index feature allows a user to switch the first index, represented by the first links 730, and the second index, represented by the second links 740, such that the second index is shown above the ground plane and the first index is shown below the ground plane. The transpose indices feature allows a user to view the second index above the ground plane, without the disorientation that may result from viewing the index from below the ground plane, where the indices will be a mirror of the indices from above the ground plane.

Finally, various exemplary embodiments of the 3D visualization, when implemented using a graphical user interface, include a superimpose indices feature. The superimpose indices feature is shown in FIG. 10 with respect to the first specific example. The superimpose index feature allows a user to overlay the second index, represented by the second links 740, on top of the first index, represented by the first links 730, such that a user can more easily compare the two indices. In various exemplary embodiments, when the superimpose indices feature is used, one or both of the index's links are rendered as semi-transparent graphical objects to facilitate viewing both indices when they overlap.

FIGS. 16–19 show a flowchart outlining one exemplary embodiment of a method for updating a 3D visualization according to this invention. As shown in FIGS. 16–19, operation of the flowchart begins in step S200 and continues to step S202, where a new or an updated set of data to be visualized is input. Next, in step S204, the new or updated set of data is compared with the current set of data. Then, in step S206, a determination is made whether there are any new elements in the data to be visualized that require a tile that is not in the current visualization. If there are such new elements in the data to be visualized, operation continues to step S208. Otherwise, operation jumps directly to step S228.

In step S208, a tile is created and placed in the visualization for each new portion or element of the data that now requires a tile in the updated visualization but for which there was not a tile in the current visualization. Then, in step S209, a first or next new tile is selected as the current tile. Then, in step S210, a height of a first index link is determined for the current tile. As described above, in various exemplary embodiments, the height of the first index value may represent the importance of the portion of the data to be visualized that is associated with the current tile. However, the height may represent some other quantifiable characteristic of the portion of the data represented by the current tile. Next, in step S212, a size of the first index link for the current tile is determined. Operation then continues to step S214.

In step S214, one or more colors of the first index link for the current tile are determined. In various exemplary embodiments, the one or more colors of the first index link represents a quality of the media data, for instance the type of data, e.g., one color for graphics, one color for text, one color for video, etc. However, the color of the first index link may represent any other salient characteristic of the media. Then, in step S216 the brightness of the first index link for the current tile is determined. As described above, in various exemplary embodiments, the brightness of the first index link may represents any quantifiable characteristic of the media, represented by the current tile, that may be compared to the same characteristic of the media represented by other tiles. In various exemplary embodiments, the brighter tile has the larger quantum of that characteristic. Operation continues to step S218.

In step S218, a determination is made whether, according to the new data set, the user has visited the first index for the data represented by the current tile. If the first index has been visited by the user, operation continues to step S220. If the first index has not been visited by the user, operation jumps to step S222. In step S220, the current tile is marked as visited. For example, according to the first specific example, a tile 720 is marked with a red circle 780 to indicate that it has been visited. However, various other methods of marking the current tile may be used. Furthermore, in various other exemplary embodiments of the method for creating an interactive 3D visualization according to this invention, a tile that has not been visited may be marked instead of a tile that has been visited. Operation continues to step S222.

In step S222, a height of a second index link for the current tile is determined. In various exemplary embodiments, the height (distance from the ground plane) of the second index value represents an average of the importance of the media represented by the current tile as determined by other group members. However, the height may represent any other quantifiable quality of the data represented by the current tile. Next, in step S224, the brightness of the second index link for the current tile is determined. In various exemplary embodiments, the brightness of the second index link may represent any quantifiable characteristic of the media, represented by the current tile, that may be compared to the same characteristic of the data represented by other tiles. In various exemplary embodiments, the brighter tile representing media with has the larger quantum of that characteristic. Operation continues to step S226.

In step S226, a determination is made whether all of the new tiles have been selected as the current tile. If all of the new tiles have not been selected as the current tile, operation returns to step S209 where the next new tile is selected as the current tile. However, if all of the new tiles have been selected as the current tile, operation continues to step S228.

In step S228, the first or next tile, selected from the tiles representing elements that exist in the current data set, is selected as the current tile. Next, in step S230, a determination is made whether the height of the first index link for the media represented by the current tile according to the new data set is the same as the height of the first index link for the media represented by the current tile according to the current data set. If so, operation jumps to step S234. If the height of the first index link for the media represented by the current tile according to the new data set is not the same as the height of the first index link for the media represented by the current tile according to the current data set, operation continues to step S232 where the height of the first index link for the media represented by the current tile is adjusted according to the new data set. Operation continues to step S234.

In step S234, a determination is made whether the size of the first index link for the media represented by the current tile according to the new data set is the same as the size of the first index link for the media represented by the current tile according to the current data set. If so, operation jumps to step S238. If the size of the first index link for the media represented by the current tile according to the new data set is not the same as the size of the first index link for the media represented by the current tile according to the current data set, operation continues to step S236 where the size of the first index link for the media represented by the current tile is adjusted according to the new data set. Operation continues to step S238.

In step S238, a determination is made whether the color of the first index link for the media represented by the current tile according to the new data set is the same as the color of the first index link for the media represented by the current tile according to the current data set. If so, operation jumps to step S242. If the color of the first index link for the media represented by the current tile according to the new data set is not the same as the color of the first index link for the media represented by the current tile according to the current data set, operation continues to step S240 where the color of the first index link for the media represented by the current tile is adjusted according to the new data set. Operation continues to step S242.

In step S242, a determination is made whether the brightness of the first index link for the media represented by the current tile according to the new data set is the same as the brightness of the first index link for the media represented by the current tile according to the current data set. If so, operation jumps to step S246. If the brightness of the first index link for the media represented by the current tile according to the new data set is not the same as the brightness of the first index link for the media represented by the current tile according to the current data set, operation continues to step S244 where the brightness of the first index link for the media represented by the current tile is adjusted according to the new data set. Operation continues to step S246.

In step S246, a determination is made whether the media represented by the current tile has been visited according to the new data set and not visited according to the current data set. If not, operation jumps to step S250. If the media represented by the current tile has been visited according to the new data set and not visited according to the current data set, operation continues to step S248 where the current tile is marked as visited. Operation continues to step S250.

In step S250, a determination is made whether the height of the second index link for the media represented by the current tile according to the new data set is the same as the height of the second index link for the media represented by the current tile according to the current data set. If so, operation jumps to step S254. If the height of the second index link for the media represented by the current tile according to the new data set is not the same as the height of the second index link for the media represented by the current tile according to the current data set, operation continues to step S252 where the height of the second index link for the media represented by the current tile is adjusted according to the new data set. Operation continues to step S254.

In step S254, a determination is made whether the brightness of the second index link for the media represented by the current tile according to the new data set is the same as the brightness of the second index link for the media represented by the current tile according to the current data set. If so, operation jumps to step S258. If the brightness of the second index link for the media represented by the current tile according to the new data set is not the same as the brightness of the second index link for the media represented by the current tile according to the current data set, operation continues to step S256 where the brightness of the second index link for the media represented by the current tile is adjusted according to the new data set. Operation continues to step S258.

In step S258, a determination is made whether all of the tiles have been selected as the current tile. If all of the tiles have not been selected as the current tile, operation returns to step S228 where the next tile is selected as the current tile. However, if all of the tiles have been selected as the current tile, operation continues to step S260.

In step S260, a determination is made whether a path (or absence of a path) through the first index according to the new data set is the same as a path (or absence of a path) through the first index according to the current data set. If so, operation jumps to step S264. If a path through the first index according to the new data set is not the same as a path through the first index according to the current data set, operation continues to step S262 where the path through the first index is adjusted according to the new data set. Operation continues to step S264.

In step S264, a determination is made whether a path (or absence of a path) through the second index according to the new data set is the same as a path (or absence of a path) through the second index according to the current data set. If so, operation jumps directly to step S268. If a path through the second index according to the new data model is not the same as a path through the second index according to the current data model, operation continues to step S266. In step S266, the path through the second index is adjusted according to the new data set. Operation then continues to step S268, where operation of the flowchart terminates.

It should be appreciated that in other exemplary embodiments of a method for updating a 3D visualization according to this invention, the 3D visualization may be updated by simply rebuilding the visualization from scratch each time new data is input. However, such embodiments may be slower, since rebuilding the unchanged portions of the 3D visualization may unnecessarily utilize system resources.

Figure 20:
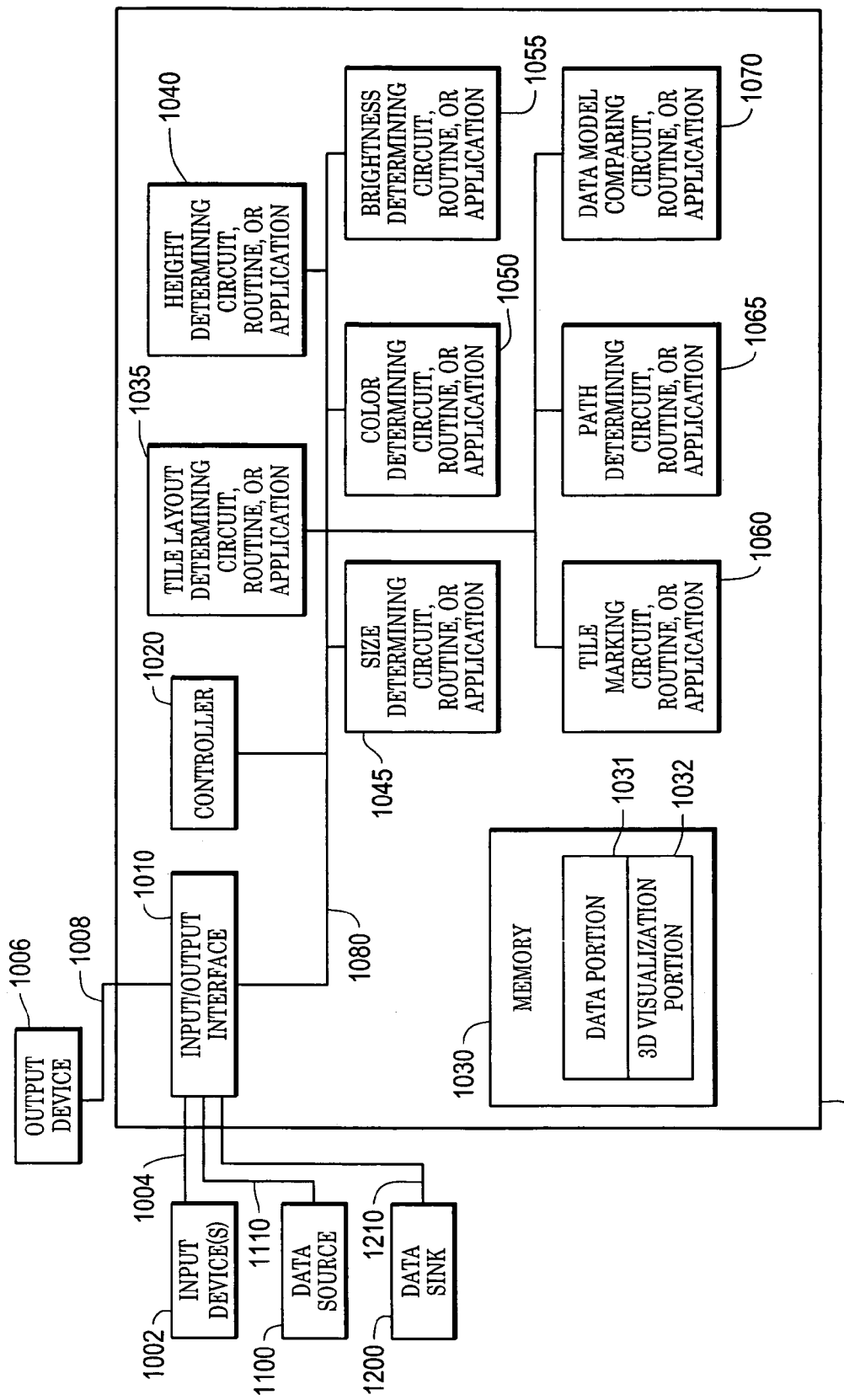
FIG. 20 shows an exemplary embodiment of a functional block diagram of one exemplary embodiment of a 3D visualization system.

FIG. 20 is an exemplary embodiment of a functional block diagram of one exemplary embodiment of a 3D visualization system 1000 that is usable to create and update 3D visualizations according to the invention. As shown in FIG. 20, the 3D visualization system 1000 includes an inputloutput interface 1010, a controller 1020, a memory 1030, a tile layout determining circuit, routine, or application 1035, a height determining circuit, routine, or application 1040, a size determining circuit, routine, or application 1045, a color determining circuit, routine, or application 1050, a brightness determining circuit, routine, or application 1055, a tile marking circuit, routine, or application 1060, a path determining circuit, routine, or application 1065, and a data comparing circuit, routine, or application 1070, each appropriately interconnected by one or more data/control busses and/or application programming interfaces 1080, or the like.

In this exemplary embodiment, the input/output interface 1010 is connected to one or more input devices 1002 over one or more links 1004. The input device(s) 1002 can be one or more of a keyboard, a mouse, a track ball, a track pad, a touch screen, a virtual reality glove, or any other known or later-developed device for inputting data and/or control signals to the 3D visualization system 1000. Furthermore, in this exemplary embodiment, the input/output interface 1010 is connected to one or more output devices 1006 over one or more links 1008. The output device(s) 1010 can be one or more of a computer monitor, cathode ray tube, liquid crystal display, image projector, electrophoretic display, virtual reality display device, or any other known or later-developed device for visually displaying the 3D visualization output from the 3D visualization system 1000.

In this exemplary embodiment, the input/output interface 1010 is connected to a data source 1100 over a link 1110. The data source 1100 can be a locally or remotely located laptop or personal computer, a personal digital assistant, a tablet computer, a device that stores and/or transmits electronic data, such as a client or a server of a wired or wireless network, such as for example, an intranet, an extranet, a local area network, a wide area network, a storage area network, the Internet (especially the World Wide Web), and the like. In general, the data source 1100 can be any known or later-developed source that is capable of providing a set of data to be visualized to the input/output interface 1010.

In this exemplary embodiment, the input/output interface 1010 is connected to one or more data sinks 1200 over one or more links 1210. The data sink(s) 1200 can be a locally or remotely located laptop or personal computer, a personal digital assistant, a tablet computer, a device that receives and stores, and/or transmits electronic data, such as for example, a client or a server of a wired or wireless network, an intranet, an extranet, a local area network, a wide area network, a storage area network, the Internet (especially the World Wide Web), and the like. In general, the data sink(s) 1200 can be any device that is capable of receiving and transmitting and/or storing the visualization generated by the 3D visualization system 1000.

Each of the various links 1004, 1008, 1110, and 1210 can be any known or later-developed device or system for connecting the input device(s) 1002, the output device(s) 1006, the data source 1100, and/or the data sink 1200, respectively, to the input/output interface 1010. In particular, the links 1004, 1008, 1110, and 1210 can each be implemented as one or more of a direct cable connection, a connection over a wide area network, a local area network or a storage area network, a connection over an intranet, a connection over an extranet, a connection over the Internet, a connection over any other distributed processing network or system, and/or an infrared, radio-frequency or other wireless connection.

As shown in FIG. 20, the memory 1030 contains a number of different memory portions, including a data portion 1031 and a 3D visualization portion 1032. The data portion 1031 of the memory 1030 stores the data to be visualized. The 3D visualization portion 1032 of the memory 1030 stores the 3D visualization.

The memory 1030 shown in FIG. 20 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-re-writeable optical disk and disk drive, a hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like.

The tile layout determining circuit, routine, or application 1035 accesses the data to be visualized and determines a tile layout. The height determining circuit, routine, or application 1040 accesses the data to be visualized and determines a height for each of the various links. The size determining circuit, routine, or application 1045 accesses the data to be visualized and determines a size for each of the various links. The color determining circuit, routine, or application 1050 accesses the data to be visualized and determines one or more colors for each of the various links.

The brightness determining circuit, routine, or application 1055 accesses the data to be visualized and determines a brightness for each color for each of the various links. The tile marking circuit, routine, or application 1060 accesses the data to be visualized, determines whether the tiles have been visited and marks the various tiles that have been visited, or, alternatively, the various tiles that have not been visited. The path determining circuit, routine, or application 1065 accesses the data to be visualized, determines whether one or more paths have been defined through the various tiles, and creates a visual representation of the path. Finally, the data comparing circuit, routine, or application 1070 accesses the data to be visualized and compares two or more sets of data to be visualized, and determines the differences between respective portions of sets of the two or more sets of data to be visualized.

In operation of the exemplary embodiment of the 3D visualization system 1000 shown in FIG. 20, under control of the controller 1020, a set of data to be visualized is input from the data source 1100 across the link 1110 via the input/output interface 1010 as a current set of data to be visualized and stored in the data portion 1031 of the memory 1030. Next, under control of the controller 1020, the tile layout determining circuit, routine, or application 1035 accesses the current data to be visualized and determines a tile layout for the 3D visualization based on the current data to be visualized. Then, under the control of the controller 1020, the tile layout is stored in the 3D visualization portion 1032 of the memory 1030.

The height determining circuit, routine, or application 1040, under control of the controller 1020, then accesses the data to be visualized stored in the data portion 1031 and determines the heights of the various first and/or second links of the 3D visualization, according to the current data to be visualized. Then, under the control of the controller 1020, the determined heights of the various first and second links are stored in the 3D visualization portion 1032. Next, under control of the controller 1020, the size determining circuit, routine, or application 1045 accesses the data to be visualized stored in the data portion 1031 and determines the sizes of the various first and/or second links for the 3D visualization, according to the current data to be visualized. Then, under the control of the controller 1020, the determined sizes of the various first and/or second links are stored in the 3D visualization portion 1032.

The color determining circuit, routine, or application 1050, under control of the controller 1020, then accesses the data to be visualized stored in the data portion 1031 and determines one or more colors for each of the various first and/or second links for the 3D visualization, according to the current data to be visualized. Then, under the control of the controller 1020, the determined colors of the various first and/or second links are stored in the 3D visualization portion 1032. Next, under control of the controller 1020, the brightness determining circuit, routine, or application 1055 accesses the data to be visualized stored in the data portion 1031 and determines the brightness for each of the various first and/or second links for the 3D visualization, according to the current data to be visualized. Then, under the control of the controller 1020, determined the brightness as of the various first and/or second links are stored in the 3D visualization portion 1032.

The tile marking circuit, routine, or application 1060, under control of the controller 1020, accesses the data to be visualized stored in the data portion 1031 of the memory 1030 and determines whether, for each tile, the portion of the data represented by that tile of the 3D visualization has been visited. Then, under the control of the controller 1020, data indicating which of tiles have been marked is stored in the 3D visualization portion 1032.

The path determining circuit, routine, or application 1065, under control of the controller 1020, accesses the data to be visualized stored in the data portion 1031 and determines whether a path through the various tiles of 3D visualization has been established. Then, under the control of the controller 1020, the path visualization elements generated are stored in the 3D visualization portion 1032.

At this point, the 3D visualization system 1000 has generated a 3D visualization of the data to be visualized that is stored in the data portion 1031. Therefore, at any time, the 3D visualization may be output via the input/output interface 1010 and across link 1004 to the output device(s) 1006.

Once the 3D visualization has been created and stored in the 3D visualization portion 1032 of the memory, that visualization may be updated. The visualization may be updated in a number of ways. A second set of data to be visualized may be input, under control of the controller 1020, to the data portion 1031 from the data source 1330 across link 1110 via the input/output interface 1010. Alternatively, a second set of data to be visualized may be created as a result of user inputs, under control of the controller 1020, being input from the input device(s) 1002 across link 1004 via the input/output interface 1010, to the data portion 1031 of the memory 1030 that alter the current data model and thereby create a new data model.

When a new data set exists in the data portion 1031 of the memory 1030, the data comparing circuit, routine, or application 1070 accesses the current data set and the new data set, under control of the controller 1020, and determines whether any new data exists according to the new data set that requires new tiles. If such new data exists, under control of the controller 1020, the tile layout determining circuit, routine, or application 1035 accesses the new data and determines the layout location of the new tiles. Then, the height determining circuit, routine, or application 1040, the size determining circuit, routine, or application 1045, the color determining circuit, routine, or application 1050, the brightness determining circuit, routine, or application 1055, and the tile marking circuit, routine, or application 1060, access the new tile data and create respective height, size, color, brightness, and marking data and store the data in the 3D visualization portion 1032 of the memory 1030.

Next, the data comparing circuit, routine, or application 1070 accesses the current data set and the new data set, under control of the controller 1020, and determines whether any qualities of the data represented by existing tiles, according to the current data set, have changed. If any qualities of the existing tiles have changed, the height determining circuit, routine, or application 1040, the size determining circuit, routine, or application 1045, the color determining circuit, routine, or application 1050, the brightness determining circuit, routine, or application 1055, and the tile marking circuit, routine, or application 1060, access the new tile data for the changed tiles and adjust the respectively changed height, size, color, brightness, and/or marking data and store the adjusted data in the 3D visualization portion 1032 of the memory 1030.

Finally, the data comparing circuit, routine, or application 1070 accesses the current data set and the new data set, under control of the controller 1020, and determines whether the path data according to the current data set is different from the path data according to the new data set. If so, the path determining circuit, routine, or application 1065, accesses the new data set and adjusts the path data stored in the 3D visualization portion 1032 of the memory 1030 accordingly.

It should be appreciated that, in other exemplary embodiments of an exemplary embodiment of a 3D visualization system 1060 that is usable to create and update 3D visualizations according to the invention, instead of employing a data comparing circuit, routine, or application 1070 to identify the portions of the data that have changed, the device could simply rebuild the 3D visualization from scratch each time that a new data to be visualized is created. However, such a device may be slower than the current exemplary embodiment, since the unchanged portions of the 3D visualization would continually be recreated as a result of each update, thereby wasting system resources. Furthermore, it should be appreciated that, depending on cost or other design constraints, one or more of the above-described elements of the 3D visualization system 1000 may be combined into a single element or divided into multiple elements where appropriate.

While the invention has been described in conjunction with exemplary embodiments, these embodiments should be viewed as illustrative, not limiting. Various modifications, substitutes, or the like are possible within the spirit and scope of the invention.

What is claimed is:

1. A method for creating a 3D visualization comprising:
    inputting a first set of data to be visualized;
    defining a plurality of tiles within a ground plane based on the first data set, each tile capable of having a first link and a second link;
    for at least one of the tiles, defining a first link related to that tile; and
    for at least one of the tiles, defining a second link related to that tile;
    wherein, each defined first link is to be displayed above the ground plane and each defined second link is to be displayed below the ground plane.

2. The method of claim 1, further comprising representing, for each defined first link, a quantifiable quality of that first link by defining the distance of the first link above the ground plane based on a value of that quantifiable quality for that first link.

3. The method of claim 2, wherein the value of the quantifiable quality of the first link is defined by a user.

4. The method of claim 1, further comprising representing, for each defined second link, a quantifiable quality of the second link by defining the distance of the second link below the ground plane based on a value of that quantifiable quality for that second link.

5. The method of claim 4, wherein the value of the quantifiable quality of the second link is defined by a defined group of users.

6. The method of claim 1, further comprising representing, for each defined first link, a characteristic of the first link by defining the size of the first link.

7. The method of claim 1, further comprising representing, for each defined second link, a characteristic of the second link by defining the size of the second link.

8. The method of claim 1, further comprising representing, for each defined first link, a characteristic of the first link by defining the brightness of the first link.

9. The method of claim 1, further comprising representing, for each defined second link, a characteristic of the second link by defining the brightness of the second link.

10. The method of claim 1, further comprising representing, for each defined first link, a characteristic of the first link by defining the color of the first link.

11. The method of claim 1, further comprising representing, for each defined second link, a characteristic of the second link by defining the color of the second link.

12. The method of claim 1, further comprising representing, for each defined first link, a characteristic of the first link by defining the shape of the first link.

13. The method of claim 1, further comprising representing, for each defined second link, a characteristic of the second link by defining the shape of the second link.

14. The method of claim 1, wherein a plurality first links are related to a plurality of tiles, each of the plurality of tiles having a respective first link, further comprising defining a path through the plurality of first links.

15. The method of claim 1, wherein a plurality second links are related to a plurality of tiles, each of the plurality of tiles having a respective second link, further comprising defining a path through the plurality of second links.

16. The method of claim 1, further comprising for each of tile with a first link or second link, switching the first links and the second links such that each second link is to be displayed above the ground plane and each first link is to be displayed below the ground plane.

17. The method of claim 1, further comprising redefining the second link such that the second link is to be displayed above the ground plane and the first link is to be displayed above the ground plane.

18. The method of claim 1, further comprising updating the visualization.

19. The method of claim 18, wherein updating the visualization comprises:
    inputting a second data set;
    comparing the first data set with the second data set;
    determining the differences between the first data set and the second data set; and
    updating the only those portions of the visualization that are determined to be different.

20. The method of claim 19, wherein the second data set is created by interaction with the visualization.

21. The method of claim 1, wherein defining a first link comprises a user defining a value for each of at least one attribute of the first link.

22. The method of claim 19, wherein defining a second link comprises:
    defining a group of users;
    averaging, for each of the at least one attribute of the first link, values that are defined by the group of users for that attribute; and
    assigning, for each of the at least one attribute of the first link, the average value of that attribute to a corresponding attribute of the second link.

23. A graphical user interface comprising:
    a ground plane defined by a plurality of tiles, each tile defined by its position relative to two axes;
    at least one first link corresponding to at least one of the tiles, each tile capable of having one first link and each first link capable of having one tile, the first link linking to media at least partially defined by the value of the tile with which the link corresponds; and
    at least one second link corresponding to at least one of the tiles, each tile capable of having one second link and each second link capable of having one tile, the second link linking to media at least partially defined by the value of the tile with which the link corresponds;
    wherein, the at least one first link is located above the ground plane, the at least one second link is located below the ground plane, and both the at least one first link and the at least one second link are at least partially viewable from above or below the ground plane.

24. The graphical user interface of claim 23, wherein there is an amount of space between each tile to aid in the viewing of the at least one first index and the at least one second index from above or below the ground plane.

25. The graphical user interface of claim 23, wherein a viewpoint of the graphical user interface is changeable in three dimensions.

26. The graphical user interface of claim 23, wherein a view angle is changeable.

27. The graphical user interface of claim 23, further comprising a transpose function which relocates the at least one second link above the ground plane and the at least one first link below the ground plane.

28. The graphical user interface of claim 23, further comprising a superimpose function which relocates the at least one second link above the ground plane.

29. A system for creating a 3D visualization comprising:
a tile layout determining circuit, routine, or application that determines a tile layout within a ground plane based on a data set, each tile capable of having a first link and a second link; and
a height determining circuit, routine, or application that:
defines, for at least one tile in the tile layout, a first link related to that tile;
defines, for at least one tile in the tile layout, a second link related to that tile; and
determines for each defined first link the distance of the first link above the ground plane and, for each defined second link, the distance of the second link below the ground plane.

30. The system of claim 29, further comprising:
a size determining circuit, routine, or application that determines, for each defined first link, the size of that first link.

31. The system of claim 30, wherein the size determining circuit, routine, or application determines, for each defined second link, the size of that second link.

32. The system of claim 29, further comprising:
a color determining circuit, routine, or application that, for each defined first link, determines the color or colors of that first link.

33. The system of claim 32, wherein the color determining circuit, routine, or application determines, for each defined second link, the color or colors of that second link.

34. The system of claim 29, further comprising:
a brightness determining circuit, routine, or application that determines, for each defined first link, the brightness of that first link.

35. The system of claim 34, wherein the brightness determining circuit, routine, or application determines, for each defined second link, the brightness of that second link.

36. The system of claim 29, further comprising:
a tile marking circuit, routine, or application that determines, according to the data set, whether any of the tiles should be marked, and marks the tiles that should be marked.

37. The system of claim 29, further comprising:
A path determining circuit, routine, or application that determines, according to the data set, whether a path has been defined through a plurality defined first link, and displays the path through the plurality of defined first links.

38. The system of claim 37, wherein the path determining circuit, routine, or application determines, according to the data set, whether a path has been defined through a plurality defined second link, and displays the path through the plurality of defined second links.

39. The system of claim 29, further comprising:
A path determining circuit, routine, or application that determines, according to the data set, whether a path has been defined through a plurality defined second link, and displays the path through the plurality of defined second links.

40. The system of claim 29, further comprising a data set comparing circuit, routine, or application that:
compares a current data set to a new data set; and
determines the differences between the new data set and the current data set.

41. A storage medium storing a set of program instructions executable on a data processing device and usable for creating a 3D visualization comprising:
instructions for inputting a set of data to be visualized;
instructions for defining a plurality tiles within a ground plane based on the data set, each tile capable of having a first link and a second link;
instructions for, for at least one of the tiles, defining a first link related to that tile; and
instructions for, for at least one of the tiles, defining a second link related to that tile;
wherein, each defined first link are to be displayed above the ground plane and each defined second link are to be displayed below the ground plane.

* * * * *